(12) United States Patent
Muirhead

(10) Patent No.: US 6,943,678 B2
(45) Date of Patent: Sep. 13, 2005

(54) THERMOFORMED APPARATUS HAVING A COMMUNICATIONS DEVICE

(75) Inventor: Scott A. W. Muirhead, Surrey (CA)

(73) Assignee: Nextreme, L.L.C., Uniontown, PA (US)

( * ) Notice: Subject to any disclaimer, the term of this patent is extended or adjusted under 35 U.S.C. 154(b) by 29 days.

(21) Appl. No.: 09/770,097

(22) Filed: Jan. 24, 2001

(65) Prior Publication Data

US 2002/0030597 A1 Mar. 14, 2002

Related U.S. Application Data

(60) Provisional application No. 60/177,383, filed on Jan. 24, 2000.

(51) Int. Cl.[7] ............................................... G08B 26/00
(52) U.S. Cl. ................. 340/505; 340/572.1; 340/572.8; 340/10.1; 340/825.36; 340/539.13; 156/226; 156/227; 156/290; 235/383; 235/384; 235/385
(58) Field of Search ........................... 340/572.1, 572.4, 340/572.8, 568.1, 10.1, 10.3, 10.32, 10.4, 10.51, 505, 539.13; 156/226, 227, 290; 705/28; 235/385, 383, 384

(56) References Cited

U.S. PATENT DOCUMENTS

| | | |
|---|---|---|
| 3,398,434 A | 8/1968 | Alesi, Jr. et al. |
| 3,583,036 A | 6/1971 | Brown |
| 3,597,799 A | 8/1971 | Earle |
| 3,695,188 A | 10/1972 | Granastein |
| 3,702,100 A | 11/1972 | Wharton |
| 3,779,687 A | 12/1973 | Alesi |
| 3,783,078 A | 1/1974 | Brodhead |
| 3,787,158 A | 1/1974 | Brown et al. |
| 3,867,088 A | 2/1975 | Brown et al. |
| 3,868,209 A | 2/1975 | Howell |
| 3,919,382 A | 11/1975 | Smarook |
| 3,919,445 A | 11/1975 | Smarook |

(Continued)

FOREIGN PATENT DOCUMENTS

| | | |
|---|---|---|
| EP | 0 249 203 | 9/1990 |
| JP | 9-41756 | 2/1997 |
| JP | 10-32851 | 2/1998 |
| WO | WO 98/21691 | 5/1998 |
| WO | WO 99/64221 | 12/1999 |

OTHER PUBLICATIONS

Plastics News article, Visteon Corp. to Thermoform Fuel Tanks, Crain Communications Inc., Oct. 16, 2000, 2 pages.
English Abstract of Japanese Patent Publication 10032851 (Feb. 16, 1998).
English Abstract of Japanese Patent Publication 090041756 (Sep. 11, 1998).

(Continued)

*Primary Examiner*—Daryl C. Pope
(74) *Attorney, Agent, or Firm*—Price & Adams

(57) ABSTRACT

An apparatus has a communications device associated therewith. In another aspect of the present invention, a pallet is made from thermoformed polymeric sheets with an attached communications device. A further aspect of the present invention provides a radio frequency identification device attached to an apparatus. In still another aspect of the present invention, a communications device is incorporated into one or more sheets of a pallet or other container prior to forming. Methods of making and using a thermoformed pallet and container, having a communications device, are also provided.

66 Claims, 12 Drawing Sheets

U.S. PATENT DOCUMENTS

| | | |
|---|---|---|
| 3,919,446 A | 11/1975 | Smarook |
| 3,964,400 A | 6/1976 | Brand |
| 4,013,021 A | 3/1977 | Steinlein et al. |
| 4,070,839 A | 1/1978 | Clem |
| 4,079,232 A | 3/1978 | Brokoff et al. |
| 4,101,252 A | 7/1978 | Brown |
| 4,113,909 A | 9/1978 | Beasley |
| 4,133,270 A | 1/1979 | Ravera |
| 4,158,539 A | 6/1979 | Arends et al. |
| 4,164,387 A | 8/1979 | Schermutzki et al. |
| 4,164,389 A | 8/1979 | Beasley |
| 4,194,663 A | 3/1980 | West et al. |
| 4,244,915 A | 1/1981 | Boardman |
| 4,255,382 A | 3/1981 | Arends et al. |
| 4,287,836 A | 9/1981 | Aoki |
| 4,348,442 A | 9/1982 | Figge |
| 4,377,377 A | 3/1983 | Arends et al. |
| 4,428,306 A | 1/1984 | Dresen et al. |
| 4,464,329 A | 8/1984 | Whiteside et al. |
| 4,488,496 A | 12/1984 | Polacco |
| 4,500,213 A | 2/1985 | Grimm |
| 4,507,348 A | 3/1985 | Nagata et al. |
| 4,509,432 A | 4/1985 | Win |
| 4,509,909 A | 4/1985 | Arends |
| 4,513,048 A | 4/1985 | Kaube et al. |
| 4,531,901 A | 7/1985 | Andersen |
| 4,555,381 A | 11/1985 | Chazal et al. |
| 4,600,376 A | 7/1986 | Gillman et al. |
| 4,606,278 A | 8/1986 | Shuert |
| 4,608,009 A | 8/1986 | Whiteside et al. |
| 4,636,348 A | 1/1987 | Whiteside |
| 4,649,007 A | 3/1987 | Bonis et al. |
| 4,666,544 A | 5/1987 | Whiteside et al. |
| 4,742,781 A | 5/1988 | Shuert |
| 4,801,347 A | 1/1989 | Garwood |
| 4,846,077 A | 7/1989 | Win |
| 4,907,515 A | 3/1990 | Win |
| 4,969,812 A | 11/1990 | Brown |
| 5,007,225 A | 4/1991 | Teasdale |
| 5,030,501 A | 7/1991 | Colvin et al. |
| 5,042,396 A | 8/1991 | Shuert |
| 5,046,434 A | 9/1991 | Breezer et al. |
| 5,071,603 A | 12/1991 | Kurumaji et al. |
| 5,088,418 A | 2/1992 | Reckermann et al. |
| 5,108,529 A | 4/1992 | Shuert |
| 5,117,762 A | 6/1992 | Shuert |
| 5,123,359 A | 6/1992 | DelBalso |
| 5,123,541 A | 6/1992 | Giannini et al. |
| 5,143,778 A | 9/1992 | Shuert |
| 5,156,782 A | 10/1992 | Ballantyne |
| 5,164,211 A | 11/1992 | Comer |
| 5,167,969 A | 12/1992 | DeMaio, Jr. et al. |
| 5,168,817 A | 12/1992 | Nulle et al. |
| 5,197,395 A | 3/1993 | Pigott et al. |
| 5,197,396 A | 3/1993 | Breezer et al. |
| 5,225,213 A | 7/1993 | Brown et al. |
| 5,226,373 A | 7/1993 | Esch |
| 5,229,648 A | 7/1993 | Sues et al. |
| 5,255,613 A | 10/1993 | Shuert |
| 5,283,028 A | 2/1994 | Breezer et al. |
| 5,283,029 A | 2/1994 | Ellemor |
| 5,329,861 A | 7/1994 | McCarthy |
| 5,329,862 A | 7/1994 | Breezer et al. |
| 5,337,681 A | 8/1994 | Schrage |
| 5,351,627 A | 10/1994 | Junaedi |
| 5,351,628 A | 10/1994 | Breezer et al. |
| 5,351,629 A | 10/1994 | Breezer et al. |
| 5,367,960 A | 11/1994 | Schleicher |
| 5,367,961 A | 11/1994 | Arai et al. |
| 5,390,467 A | 2/1995 | Shuert |
| 5,391,251 A | 2/1995 | Shuert |
| 5,401,347 A | 3/1995 | Shuert |
| 5,402,735 A | 4/1995 | DeJean |
| 5,404,829 A | 4/1995 | Shuert |
| 5,407,632 A | 4/1995 | Constantino et al. |
| 5,408,937 A | 4/1995 | Knight, IV et al. |
| 5,413,052 A | 5/1995 | Breezer et al. |
| 5,427,732 A | 6/1995 | Shuert |
| 5,448,110 A | 9/1995 | Tuttle et al. |
| 5,470,641 A | 11/1995 | Shuert |
| 5,479,416 A | 12/1995 | Snodgrass et al. |
| 5,492,069 A | 2/1996 | Alexander et al. |
| 5,505,141 A | 4/1996 | Barber |
| 5,517,188 A | 5/1996 | Carroll et al. |
| 5,527,585 A | 6/1996 | Needham et al. |
| 5,531,585 A | 7/1996 | Lupke |
| 5,535,668 A | 7/1996 | Besaw et al. |
| 5,539,775 A | 7/1996 | Tuttle et al. |
| 5,555,820 A | 9/1996 | Shuert |
| 5,583,819 A | 12/1996 | Roesner et al. |
| 5,596,933 A | 1/1997 | Knight et al. |
| 5,606,921 A | 3/1997 | Elder et al. |
| 5,620,715 A | 4/1997 | Hart et al. |
| 5,624,622 A | 4/1997 | Boyce et al. |
| 5,624,630 A | 4/1997 | Breezer et al. |
| 5,635,129 A | 6/1997 | Breezer et al. |
| 5,635,306 A | 6/1997 | Minamida et al. |
| 5,638,760 A | 6/1997 | Jordan et al. |
| 5,649,295 A | 7/1997 | Shober et al. |
| 5,657,007 A * | 8/1997 | Anderson et al. ........... 340/904 |
| 5,661,457 A | 8/1997 | Ghaffari et al. |
| 5,664,322 A | 9/1997 | Best |
| 5,676,064 A | 10/1997 | Shuert |
| 5,686,928 A | 11/1997 | Pritchett et al. |
| 5,687,652 A | 11/1997 | Ruma |
| 5,708,423 A | 1/1998 | Ghaffari et al. |
| 5,716,581 A | 2/1998 | Tirrell et al. |
| 5,755,162 A | 5/1998 | Knight et al. |
| 5,769,003 A | 6/1998 | Rose et al. |
| 5,774,876 A | 6/1998 | Woolley et al. |
| 5,778,801 A | 7/1998 | Delacour |
| 5,782,129 A | 7/1998 | Vanderzee et al. |
| 5,791,262 A | 8/1998 | Knight et al. |
| 5,794,542 A | 8/1998 | Besaw |
| 5,794,544 A | 8/1998 | Shuert |
| 5,800,846 A | 9/1998 | Hart |
| 5,813,355 A | 9/1998 | Brown et al. |
| 5,814,185 A | 9/1998 | Chun et al. |
| 5,818,348 A | 10/1998 | Walczak et al. |
| 5,822,683 A | 10/1998 | Pashen |
| 5,822,714 A | 10/1998 | Cato |
| 5,830,299 A | 11/1998 | Teixidor Casanovas et al. |
| 5,836,255 A | 11/1998 | Uitz |
| 5,843,366 A | 12/1998 | Shuert |
| 5,845,588 A | 12/1998 | Gronnevik |
| 5,860,369 A | 1/1999 | John et al. |
| 5,862,760 A | 1/1999 | Kohlhaas |
| 5,868,080 A | 2/1999 | Wyler et al. |
| 5,879,495 A | 3/1999 | Evans |
| 5,885,691 A | 3/1999 | Breezer et al. |
| 5,894,803 A | 4/1999 | Kuga |
| 5,900,203 A | 5/1999 | Needham et al. |
| 5,908,135 A | 6/1999 | Bradford et al. |
| 5,921,189 A | 7/1999 | Estepp |
| 5,929,779 A | 7/1999 | MacLellan et al. |
| 5,933,354 A | 8/1999 | Shimada et al. |
| 5,936,527 A | 8/1999 | Isaacman et al. |
| 5,942,987 A | 8/1999 | Heinrich et al. |
| 5,950,545 A | 9/1999 | Shuert |
| 5,950,546 A | 9/1999 | Brown et al. |
| 5,955,950 A | 9/1999 | Gallagher, III et al. |

| | | | |
|---|---|---|---|
| 5,963,144 A | 10/1999 | Kruest | |
| 5,967,057 A | 10/1999 | Nakayama et al. | |
| 5,971,592 A | 10/1999 | Kralj et al. | |
| 5,973,599 A | 10/1999 | Nicholson et al. | |
| 5,975,879 A | 11/1999 | Dresen et al. | |
| 5,980,231 A | 11/1999 | Arends et al. | |
| 5,986,569 A | 11/1999 | Mish et al. | |
| 5,986,570 A | 11/1999 | Black et al. | |
| 5,993,724 A | 11/1999 | Shuert | |
| 5,999,091 A | 12/1999 | Wortham | |
| 6,006,677 A | 12/1999 | Apps et al. | |
| 6,013,949 A | 1/2000 | Tuttle | |
| 6,018,641 A | 1/2000 | Tsubouchi et al. | |
| 6,018,927 A | 2/2000 | Major | |
| 6,021,721 A | 2/2000 | Rushton | |
| 6,025,780 A | 2/2000 | Bowers et al. | |
| 6,027,027 A | 2/2000 | Smithgall | |
| 6,029,583 A | 2/2000 | LeTrudet | |
| 6,199,488 B1 | 3/2001 | Favaron et al. | |
| 6,483,434 B1 * | 11/2002 | UmiKer | 340/572.1 |
| 2002/0017745 A1 | 2/2002 | Vorenkamp et al. | |
| 2002/0020487 A1 | 2/2002 | Vorenkamp et al. | |
| 2002/0020705 A1 | 2/2002 | Vorenkamp et al. | |

OTHER PUBLICATIONS

Kevin R. Sharp, http://www.idsystems.com/implementer/articles/deli0299.htm, A Delicate Balance: Multifrequency RF Management, 4 pages, Feb. 1999.

Kevin R. Sharp, http://www.idsystems.com/reader/1999_03/phys0399.htm, Physical Reality, 4 pages, Mar. 1999.

Kevin R. Sharp, http://www.idsystems.com/reader/1999_09/rfid0999.htm, RFID: What's It Worth to You?, 4 pages, Sep. 1999.

Kevin R. Sharp, http://www,idsystems.com/reader/1999_11/good1199.htm, Good Design Makes RFID Work, 4 pages, Nov. 1999.

Kevin R. Sharp, http://www.idsystems.com/reader/1999_05/join0599.htm, Joint Venture Produces New RFID Chips, 4 pages, May 1999.

Kevin R. Sharp, http://www.idsystems.com/reader/1999_05/less0599.htm, Lessons from the Front, 5 pages, May 1999.

Paul Quinn, http://www.idsystems.com/reader/1999_05/comm0599/comm09599.htm, Could this be the Start of Something Big!, 2 pages, May 1999.

Paul Quinn, http://www.idsystems.com/reader/2000_01/high0100/high0100htm, A Highly Pallet–able Solution, 3 pages, Jan. 2000.

MicroID™ 125 kHz RFID System Design Guide, entire booklet, 1998 Microchip Technology Inc., Dec. 1998.

FastTrack™ Series RFID Tags, Escort Memory Systems, Inc. 1999, Publication No. 17–5128, 6 pages.

Jay Werb & Colin Larel, http://www.pinpointco.com/_private/whitep Designing a Positioning System for Finding Things and People Indoors, 11 pages, 1988.

Tag–it™ Inlays Texas Instruments, 2 sheets, 1999.

* cited by examiner

FIG. 17
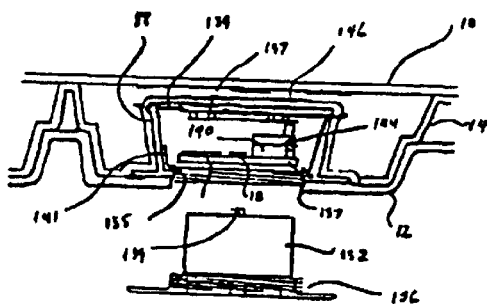
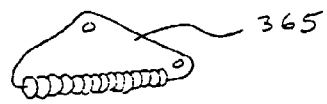
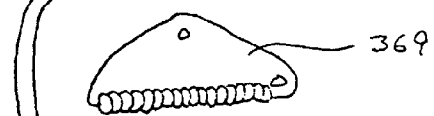
FIG. 24

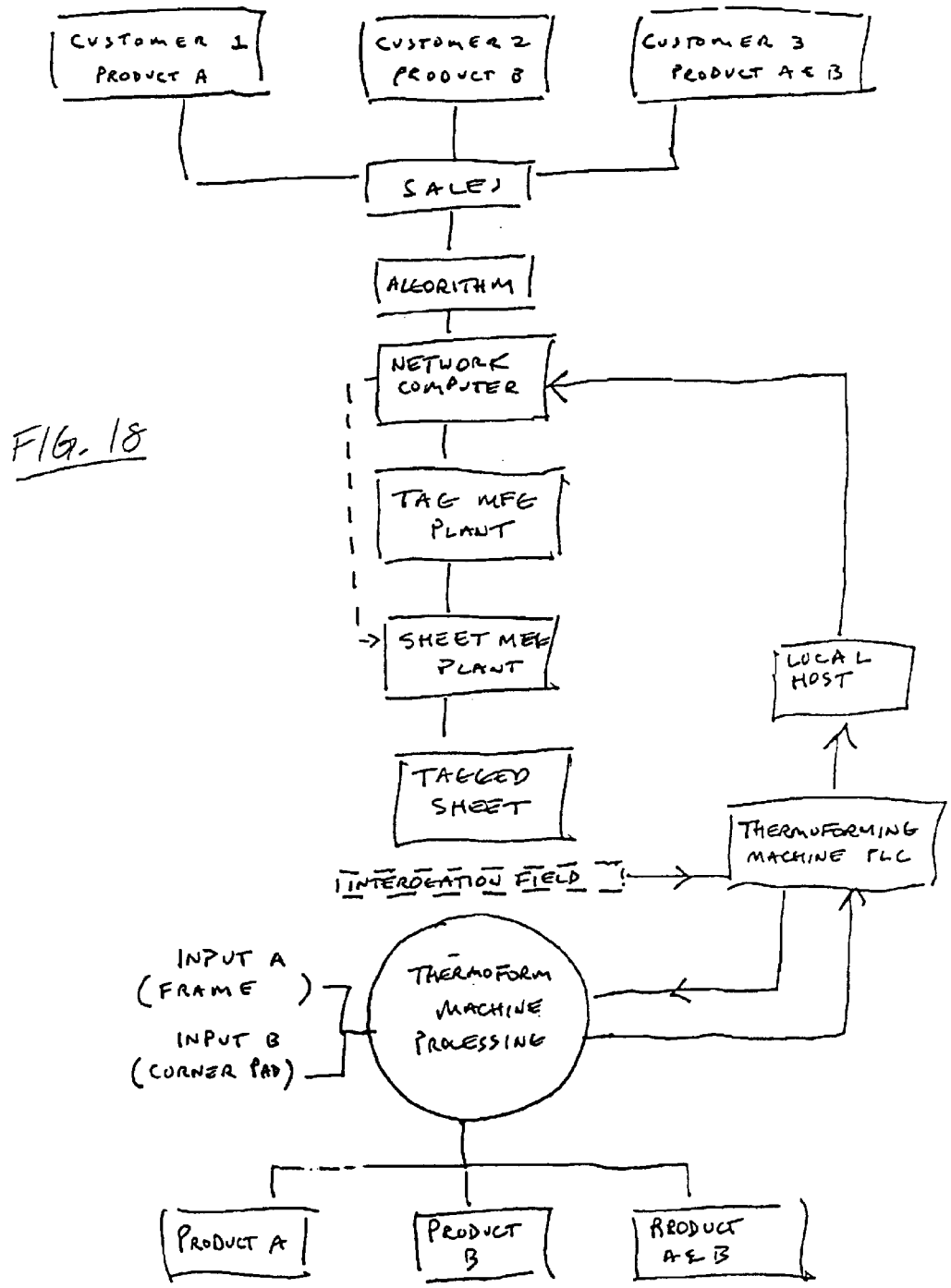

THERMOFORMED APPARATUS HAVING A COMMUNICATIONS DEVICE

This application claims the benefit of provisional application No. 60/177,383, filed Jan. 24, 2000.

BACKGROUND OF THE INVENTION

This invention generally relates to thermoformed apparatuses and more particularly to a polymeric pallet or container having a communications device.

The 48 inch by 40 inch wood pallet is an integral part of North America's distribution system, and is involved in one way or another in the movement of a significant proportion of all goods bought and sold. According to *Material Handling Engineering* (October 1999), page 16, the U.S. Forest Service estimates there are 1.9 billion wooden pallets in America. Approximately 400 million new pallets are needed each year. 175 million of these are pallets repaired for reuse by industry. Therefore, roughly 225 million new wooden pallets enter the supply chain each year. The standard 48 inch by 40 inch wood pallet makes up a significant proportion of the total number of wood pallets within the over-all distribution system.

U.S. Forest researchers also found that 225 million wooden pallets are sent to landfills each year. According to CHEP Equipment Pooling Systems, the largest third party pallet leasing company with 94 million wooden pallets, the average 48 inch by 40 inch wooden pallet weighs between 28 pounds and 65 pounds at the time of manufacture (dry). These traditional wooden pallets range from 48 pounds to 110 pounds in weight (wet) at time of recycling or disposal. Using these figures, approximately 17.8 billion pounds of wood is deposited in landfills each year. APA, the Engineered Wood Association, estimates that a standard 48 inch by 40 inch style lumber stringer pallet has a three year life. The three year cost for this style of wooden pallet is estimated to be $11.74. A three year life is based on 15–24 trips per year. Conventional wooden pallets have limited residual value at the end of their useful life cycle.

According to the Grocery Manufacturers of America (hereinafter "GMA"), the largest end-user of traditional 48 inch by 40 inch wooden pallets within the North American distribution system, the current wooden pallet exchange system costs the industry nearly $2 billion to operate in 1991. For example, the trucking industry is unable to optimize semi trailer loading or per-unit transportation costs because GMA style pallets are not capable of true four-way entry. Drivers are required to exchange loaded pallets for empty pallets after delivery, and because of manual pallet handling injuries, workers compensation claims are significant. Grocery distributors are unable to use automated material handling equipment efficiently because unacceptable wooden pallets must be removed from the pallet supply chain. Grocery manufacturers and shippers experience product damage because of design flaws in traditional wooden pallets. Furthermore, unit loading is not evenly distributed with stringer pallet designs, which results in product and packaging damage in transport. Manufacturers must use stronger and costlier packaging because of wooden pallet problems. Wooden pallet sanitation and moisture absorption difficulties affect meat and other food processors. Moreover, general pallet deterioration, manifested by protruding nails and staples, splintered wood and missing stringers, results in significant inefficiencies within the over-all distribution system.

More and more companies are finding it preferable to employ third-party pallet management services to control the costs and logistics of using wooden pallets. For example, some fruit growers require pallets on a seasonal basis. Wooden pallets may therefore be rented for short or long terms from third parties. Third party service companies offer nationwide access to pools of wooden pallets, have responsibility for collecting and redeploying pallets where they are needed, and keep the pallet pool at a relatively high level of quality to move product through the distribution channel. The pallet tracking and retrieval systems deployed by the third party providers are more elaborate and efficient than other segments within the wooden pallet market. For example, bar code labels have been used to manage the efficiency of conventional pallet assets. A direct line of sight is, however, required by the scanner to read a bar card label. The performance of these systems has been generally unreliable and costly to implement within a wooden pallet environment.

Conventional Radio Frequency Identification (hereinafter "RFID") systems have also been used but without success for a number of reasons. For instance, there are too many makes and models of 48 inch by 40 inch wooden pallets in the market. Also, a standard protocol has not been advanced. Furthermore, pallet handling procedures, material deterioration, product damage and repair practices require a more robust RFID tag technology than is currently available and wood is not a stable platform for the attachment of many types of RFID tags. Additionally, radio frequencies are absorbed by moisture in wood, which makes tag reads unreliable. Standard harsh operating conditions within the wooden pallet distribution system, thermal shock, sanitation, flexure, vibration, compressive forces and fork impacts, can cause traditional tag transponder coils to break and fail.

The velocity at which 48 inch by 40 inch wooden pallets travel through the distribution system is far less than optimum because a significant proportion of wooden pallets are not suitable for transporting goods, damage free. Although 175 million pallets are repaired each year, industry observers claim as many as 70% of all wooden pallets have deteriorated from their original specifications. Unacceptable wooden pallets have to be separated from acceptable wooden pallets, which is time consuming, injurious and wasteful. Accordingly, a far larger pool of wooden pallets is maintained in operation than would otherwise be required under optimum conditions. The traditional 48 inch by 40 inch wooden pallet is therefore tremendously inefficient, costing industry billions of dollars annually. Wooden pallets also have considerable negative societal and environmental impacts because the recourses used to purchase, repair and dispose wooden pallets could be more effectively deployed in other less costly product technology alternatives.

Accordingly, plastic pallets have been used to replace wood pallets with some degree of success over the past several years. Plastic pallets are known for their longevity and are generally more durable, lighter weight, compatible with automated material handling equipment, easily sanitized and 100 percent recyclable. Conventional plastic pallets, however, suffer from one significant disadvantage in that they cost considerably more than a comparable wooden pallet. Thermoplastic materials constitute a significant proportion of the total cost of a plastic pallet, and a given amount of relatively expensive polymeric material is required to produce a pallet with a measure of load-bearing strength that is comparable to wooden pallets.

As another example, U.S. Pat. No. 5,986,569 which issued to Mish et al. proposes applying a pressure sensitive tape to the backside of a tag carrier and affixing the carrier to an object. Generally speaking, however, exterior attachment methodologies are not sufficiently robust and durable. Tags affixed to the exterior of the pallet can be damaged through wear and tear, sanitation, fork lift impacts, and the like. Also, U.S. Pat. No. 5,936,527 which issued to Isaacman, et al., proposes a "cell" comprising a host transceiver and several local hard lined interrogators that detect local tags. In the Isaacman arrangement, several cells can be networked, which allows any tagged object to be identified from any PC within a multi-cell network.

It is significant that plastic pallet suppliers have been unable to physically identify, locate and track, in real time, comparatively expensive conventional plastic pallets within networks of distribution. It is one thing to lose a low cost wooden pallet, but it is another to lose an expensive asset. Different technologies have been proposed to attempt tracking of pallet assets within the distribution system, but these proposals have been incomplete with respect to system architectures, protocols and plastic pallet design intent. Bar codes have been used, but these again require a direct line of sight and have therefore been difficult to implement. RFID tags have been placed upon traditional molded pallets to locate and track their positions within the distribution system, but this type of pallet is so much more expensive than a comparable wooden pallet that the cost justification for implementation is not economical.

Moreover, it is known that conditions within the operating environment affect the performance of the RFID system. Several U.S. patents disclose protocols, circuitry architectures and other enabling methods for ensuring the interrogator properly communicates with one or more tags within an interrogation zone; these include: U.S. Pat. No. 5,229,648 which issued to Shindley et al.; U.S. Pat. No. 5,479,416 which issued to Snodgrass et al.; U.S. Pat. No. 5,539,775 which issued to Tuttle et al.; U.S. Pat. No. 5,583,819 which issued to Roesner et al.; U.S. Pat. No. 5,818,348 which issued to Walezak et al.; U.S. Pat. No. 5,822,714 which issued to Cato; U.S. Pat. No. 5,929,779 which issued to MacLellen et al.; U.S. Pat. No. 5,942,987 which issued to Heinrich et al.; U.S. Pat. No. 5,955,950 which issued to Gallagher et al.; U.S. Pat. No. 5,963,144 which issued to Kruest; and U.S. Pat. No. 5,986,570 which issued to Black et al. Still other proposals are offered to overcome the antenna-to-antenna communication difficulties conventionally experienced by tag carriers, such as pallets, as they travel through interrogation fields or portals. The rapidly changing angular geometry of a tag passing through a field or portal results in a diminishing duration and strength of signal transmission, which can produce unreliable tag reading results. The following U.S. patent Nos. propose solutions to this particular problem: U.S. Pat. No. 5,661,457 which issued to Ghaffari et al.; U.S. Pat. No. 5,708,423 which issued to Ghaffari et al.; U.S. Pat. No. 5,686,928 which issued to Pritchett et al.; U.S. Pat. No. 5,995,898 which issued to Tuttle; and U.S. Pat. No. 5,999,091 which issued to Wortham.

SUMMARY OF THE INVENTION

In accordance with the present invention, an apparatus has a communications device associated therewith. In another aspect of the present invention, a pallet is made from thermoformed polymeric sheets with an attached communications device. A further aspect of the present invention provides a radio frequency identification device attached to an apparatus. In still another aspect of the present invention, a communications device is incorporated into one or more sheets of a pallet or other container prior to forming. Methods of making and using a thermoformed pallet and container, having a communications device, are also provided.

The pallet of the present invention is advantageous over traditional constructions in that the present invention enhances protection of the communications device within the pallet in order to increase durability and reliability of the identification system. The locational placement of the communications device within the pallet allows for increased ability to track and identify polymeric pallets or other removable part transportation and storage containers, carriers, tanks or structures. Furthermore, the present invention is advantageous by incorporating the communications device into the pallet during the process of manufacturing the pallet. This advantageously allows for the information contained in the device to vary the pallet manufacturing machinery and the manufacturing process. Moreover, the present invention increases the economical feasibility for using traditionally more expensive polymeric pallets in the distribution chain through increased durability, tracking, recyclability and optimized manufacturing processes.

More specifically, the apparatus of the present invention advantageously employs a stronger plastic pallet that is lower cost, lighter weight, one hundred percent recyclable and wirelessly networked to a data center developed to efficiently manage the transportation of goods, damage free, throughout the distribution system. Furthermore, the present invention provides an economically viable plastic pallet replacement for traditional wooden pallets. The present invention also fulfills the need for a system that can be used to accelerate the velocity of pallet movement within the distribution system; hence, the present invention advantageously reduces the over-all number of plastic pallets within the distribution system. A suitable plastic pallet coupled to an RFID system and the methods of the present invention enable the pallets to be more effectively managed according to pre-selected system capabilities, objectives and cost constraints, while at the same time reducing the societal burden and environmental impact of conventional wooden pallets. Additional advantages and features of the present invention will become apparent from the following description and appended claims, taken in conjunction with the accompanying drawings.

BRIEF DESCRIPTION OF THE DRAWINGS

FIG. 17 is a cross sectional view showing replacement of a battery for the alternate embodiment of the present invention pallet;

FIG. 18 is a flow chart showing another preferred embodiment of the present invention pallet;

FIG. 24 is an exploded perspective view showing an alternate embodiment renewable power supply device employed in the present invention apparatus.

DETAILED DESCRIPTION OF THE PREFERRED EMBODIMENTS

Figure 1:
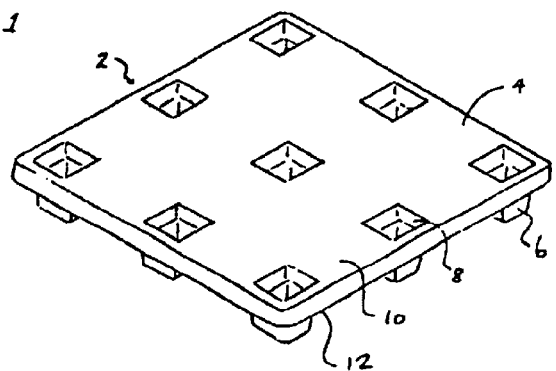
FIG. 1 is a perspective view showing a preferred embodiment of a thermoformed pallet having a radio frequency device of the present invention.
Figure 2:
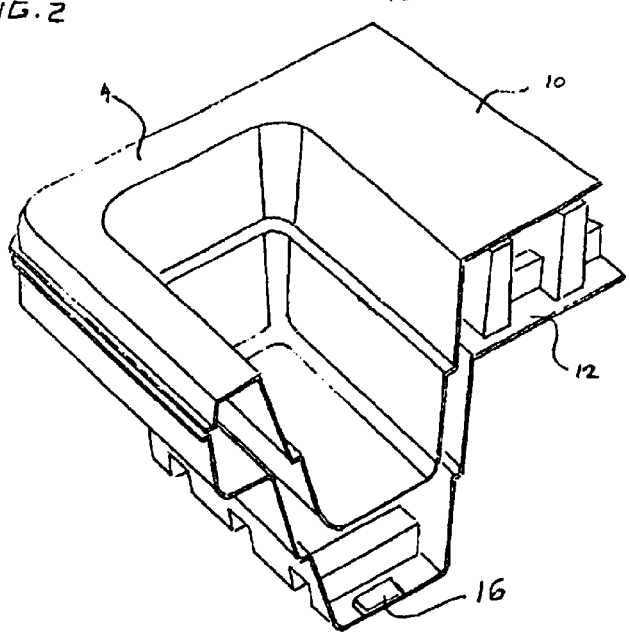
FIG. 2 is a fragmentary perspective view showing a twin sheet variation of the present invention pallet.
Figure 3:
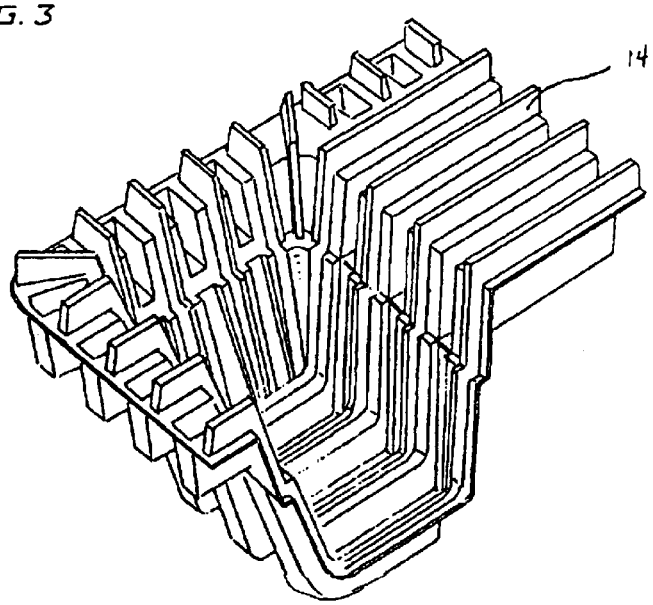
FIG. 3 is a perspective and fragmentary view showing a second variation of the present invention pallet.

Referring to FIGS. 1–3, the preferred embodiments of a pallet apparatus 2 of the present invention employs a nesting pallet 4 and a communications device, such as a radio frequency identification device 16. Nesting pallet 4 has downwardly extending pallet legs 6 which are receivable in pallet pockets 8 of an adjacent pallet to provide a nesting configuration for consolidated storage and transportation. Pallet 4 is made of a plurality of polymeric plastic sheets thermoformed into a single article. Pallet 4 includes a top plastic sheet 10 and a bottom plastic sheet 12. This arrangement is referred to as a twin sheet construction. In one preferred embodiment, plastic sheet 14, shown in FIG. 3, is sandwiched between sheets 10 and 12, in what is referred to as a triple sheet construction. One advantage of a triple sheet construction is that the same load bearing strength of a twin sheet construction can be provided with a much lower measure of relatively expensive plastic in a triple sheet construction. Therefore, depending upon the criteria of the end-user, triple sheet constructions can be used to provide either a lower cost or a stronger pallet 4. The present invention pallet 4 can be made in accordance with U.S. patent application Ser. No. 09/377,792, entitled "Triple Sheet Thermoforming Apparatus, Methods and Articles" which was filed on Aug. 20, 1999 by S. Muirhead; this is incorporated by reference herein. In summary, this method of triple sheet thermoforming provides the same measure of load bearing strength with twenty-five percent to fifty percent less plastic material than current state of the art twin sheet thermoformed pallets. However, twin sheet thermoformed pallets characterized by U.S. Pat. No. 4,428,306 to Dresen et al., U.S. Pat. No. 5,638,760 to Jordan et al., or U.S. Pat. No. 5,676,064 to Shuert, can be used to practice certain aspects of the invention; these patents are incorporated by reference herein. A triple sheet thermoformed pallet is preferred because it provides a higher measure of strength for the given measure of plastic used by a twin sheet pallet, and is therefore more economically fulfilling the need for a low cost alternative to wooden pallets.

The RFID system is minimally composed of three components including an interrogator (reader or exciter), tag devices 16, and a host computer. The tag is alerted by a radio frequency wave transmitted by the interrogator to return a data message by arrangement. The information stored in memory is thus transmitted back to the interrogator. Information received by an interrogator is used by a host computer to provide a reliable and a secure architecture that meets predetermined performance requirements. In passive RFID systems, the RF field generates voltage that is rectified to power the tag. In active RFID systems, a battery is the source of a tag's power supply. Both passive and active RFID devices may be embedded within the structure of the preferred plastic pallet.

Radio frequency identification tags and interrogators can be made in accordance with the following U.S. Pat. No. 6,027,027 entitled "Luggage Tag Assembly" which issued to Smithgall on Feb. 22, 2000 and U.S. Pat. No. 6,013,949 entitled "Miniature Radio Frequency Transceiver" which issued to Tuttle on Jan. 11, 2000. Both of these patents are incorporated by reference herein.

RFID device 16 is encapsulated between the sheets forming pallet 4. In general, thermoplastic resins are extruded through a machine that produces a selective sheet or web of heat deformable plastic. As the preformed sheet or web travels through the extruder, one or more surfaces of the sheet receives one or more RFID tags. This may be done automatically or manually such that the tag is located on the plastic according to predetermined criteria corresponding to a select molding position upon the thermoforming tooling. The sheet thus tagged moves through a thermoforming machine that molds the sheet into a finished pallet. The tag or tags are sandwiched between the sheets of plastic forming the pallet at predetermined locations. In this manner, the tag is embedded, isolated, protected and contained in a fluid tight plastic barrier that is resilient, long lasting and not externally, physically visible. In order to ensure that the RFID device is not damaged in the thermoforming process of preference, a high temperature RFID device methodology, such as that described in U.S. Pat. No. 5,973,599 which issued to Nicholson et al., may be used; this patent is also incorporated by reference herein. The location of the device within the pallet is selected for system requirements. A plurality of locations can be used by cross-referencing machine and extrusion direction dimension references upon the plastic sheet with their counter part locations upon the properly thermoformed article. Thus, through such registration techniques, a consistent location for positioning the tag upon the sheet relative to its selected location in the finished part can be repeated with a high degree of certainty. In more detail, molded-in structures of the plastic pallet may be adapted to further protect the RFID device from flexural and compressive forces that may otherwise damage the device.

RFID device 16 is part of a system in which data about pallet 4 is stored for retrieval according to system criteria. The advantage of encapsulating RFID device 16 within the structure pallet 4 is so that device 16 is protected from the harsh environment that pallet 4 must operate within.

Figure 4:
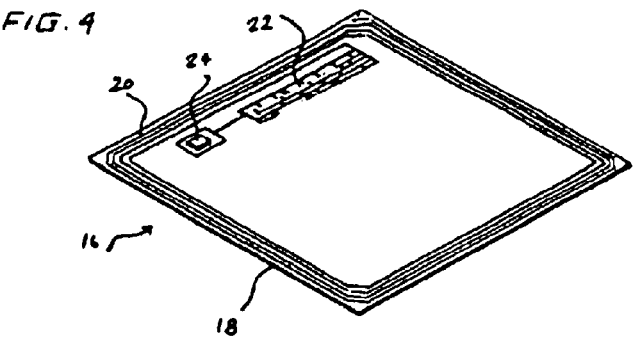
FIG. 4 is a perspective view showing the radio frequency device employed in the present invention pallet.

There are a number of methods that can be used to insert RFID device 16 within thermoformed pallet 4. In one embodiment, RFID device 16 is a passive RFID tag 18. An example of such a passive tag 18 is shown in FIG. 4. Tag 18 includes an antenna coil 20, modulation circuitry 22 and a micro-memory chip or integrated circuit 24. Tag 18 is ultra thin, and in the order of 1 and ½ square inches. A plurality of tags 18 are normally placed upon a polymer tape substrate by the tag manufacturer and delivered on reels for integration into a manufacturing process.

Figure 5:
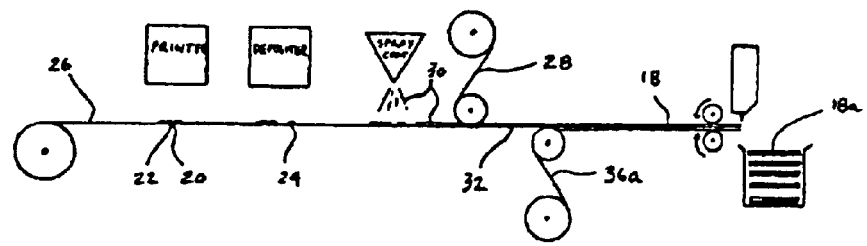
FIGS. 5–7 are diagrammatic views showing the manufacturing process employed with the present invention pallet.
Figure 6:
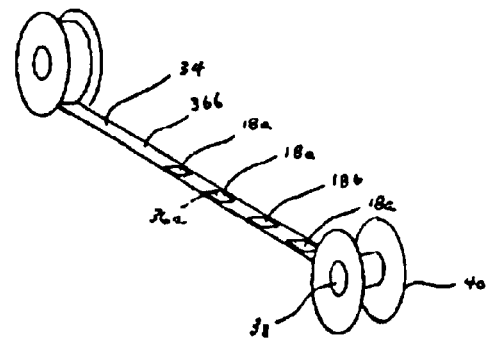

A plastic sheet is heated to a deformable temperature before it is molded by differential vacuum pressure over a mold. Intervention is required to integrate tag 18 into the thermoforming process in order to minimize stretching and heat deformation of the PET substrate. As is shown in FIGS. 4–6, the first means of intervention includes depositing coil 20, circuitry 22 (composed of printable conductive ink) and memory chip 24 upon a flexible film substrate 26. Substrate 26 is a plastic material that has a high heat deflection capability of >600° F., such as Rodgers Engineering's electrical grade HT 12-1024 resin. After tag 18 components are deposited onto substrate 26, a film substrate 28 of substantially the same construction is laminated over substrate 26 with a suitable high temperature resistant adhesive 30 therebetween to provide a double layered substrate assembly 32. A first pressure sensitive, double sided film 36a is then applied to substrate assembly 32 on the substrate side. Substrate assembly 32 is subsequently sliced or severed such that individual tags 18a are produced. Tags 18 are separately and possibly sequentially deposited onto a paper or plastic carrier 34 with a single sided, pressure sensitive adhesive film 36b. Plastic carrier 34 is wound around a hub 38 to produce a reel 40 that includes a plurality of tags 18 that adhered to the surface of a plastic sheet by way of first adhesive film 36a.

This arrangement produces a tag construction that is resistant to deformation under the short-term and high heat environment of the thermoforming process. Substrate 32 of tag 18 will not significantly stretch as the attached sheet 62 is deformed over a three dimensional molding surface. Moments of shear at the location of tag 18 will also be deflected through movement of adhesive film 36a. Adhesive 30 will deflect compression upon the memory chip by providing a compression buffer (thickness) equal to the elevation of memory chip 24. In this manner, tag 18 is developed to sustain the rigors of thermoforming.

Another alternate variation of the communications device in the structure of the pallet provides a power supply, an antenna, a radio frequency transmitter, a radio frequency receiver, a digital signal processor, a pallet information memory chip set, a pallet identification reader card, and circuitry. The memory chip set controls the function of the communicator and the identification reader card identifies the communicator and pallet. The communications device will thereby remotely communicate with an external interrogator in a wireless manner, such as by cellular telephone types of transmissions. This is used to instruct the interrogator to then query tags on or in the pallet or container. The interrogator also includes a power supply, an antenna, a radio frequency transmitter, a radio frequency receiver, a data processing micro-controller and circuitry.

Figure 7:
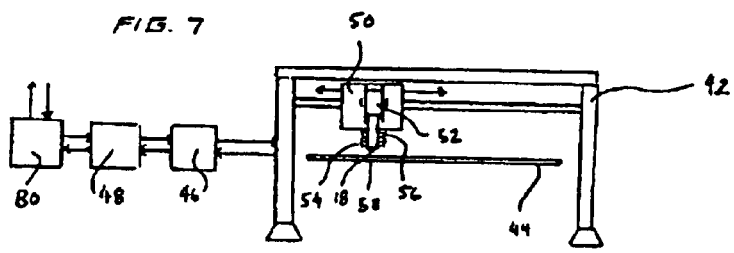

Referring to FIG. 7, an X-Y gantry 42 is positioned along the path traveled by a web 44 of plastic material produced by the sheet extrusion machine (not shown). Gantry 42 cooperates with a programmable logic controller (hereinafter "PLC") 46 that is connected to a local area networked personal computer (hereinafter "LAN PC") 48. Gantry 42 has a linear high-speed indexer 50 that travels horizontally back and forth according to instructions from PLC 46. Indexer 50 further has a reel 40 (see FIG. 6)-to-reel 52 winder apparatus 54 with a vertical press 56. As web 44 travels through gantry 42, indexer 50 travels to a pre-defined location 58, winder apparatus 54 meters reel 40 forward, carrying tag 18 into vertical alignment with press 56. Press 56 is instructed to travel vertically to stamp tag 18 onto web 44. Plastic web 44 travels the length of the extruder and is finally sheared into a standardized sheet dimension at the end of the line thereby defining sheet 62. Subsequently, the sheet and tag 18 are transported to a thermoforming machine for processing.

Figure 8:
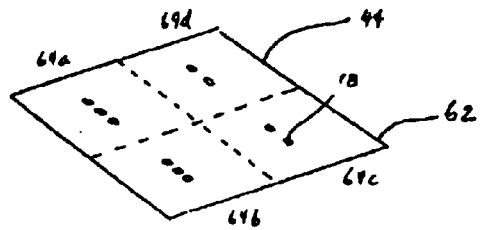
FIG. 8 is a diagrammatic perspective view showing the orientation of one radio frequency device arrangement incorporated into the present invention pallet.

Referring to FIG. 8, plastic web 44 is adapted in the machine and extrusion directions to produce a plastic sheet that is dimensioned to be thermoformed against four separate molding application surfaces 64a, 64b, 64c and 64d, illustrated separately by dashed line areas. In this manner, four pallets 4 are then produced simultaneously in the subsequent thermoforming operation. Multiple tags 18 are located on sheet 62. On each of surfaces 64a and 64b, there are three tags 18. There are also two tags 18 on surfaces 64c and 64d. Thus, batches of pallets 4 can be custom made for different end-uses. PC 48 interfaces with PLC 46 to instruct indexer 50 to deposit tags 18 in a selective manner. In other embodiments of the present invention, there may be multiple gantries 42 or multiple indexers 50 on one gantry 42 for depositing a variety of RFID tags 18a, 18b, 18c, 18d and 18e upon sheet 62. Alternatively, a host computer 80 may interface with a LAN PC instructing further systems (not shown) to apply a sequential array of tags 18a, 18b, 18c, 18d or 18e upon carrier 34 (see FIG. 6) producing reel 40, in the corresponding order to their deposition upon sheet 62.

Figure 9:
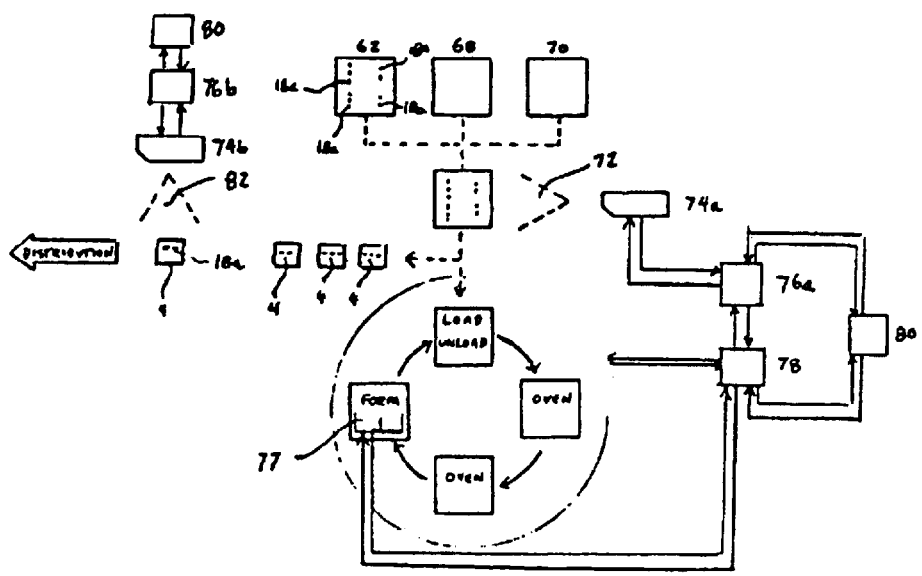
FIG. 9 is a diagrammatic view showing the manufacturing process employed with the present invention pallet.

In the preferred order of arrangement shown in FIG. 9, sheet 62 is thermoformed against a female mold located upon the lower platen of the thermoforming machine. In this manner, when sheet 62 is thermoformed, tags 18 will be encapsulated when molded sheet 68 is selectively fused to sheet 62 in the thermoforming process This creates a protective barrier around each tag 18. It should be appreciated, however, that other sheet forming sequences may be utilized in a variety of thermoforming techniques to accomplish the present method.

One of the tags, in this example tag 18a, interfaces with a Manufacturing Management System (hereinafter "MMS") deployed throughout the overall manufacturing infrastructure. Sheets 62, 68 and 70 (in the triple sheet method) are conveyed to a thermoforming machine RF interrogator field 72, where a RFID tag interrogator 74 identifies and reads data stored on tags 18a. Tags 18a send preprogrammed data packages back to interrogator 74a. Interrogator 74a interfaces with LAN PC 76 connected to thermoforming machine PLC 78 interfacing through LAN to MMS host computer 80. PLC 78 instructs machine and ancillary equipment how to process plastic sheets 62, 68 and/or 70. PLC 76 next instructs tooling 77 how to process plastic sheets 62, 68 and/or 70. If the MMS criteria are not met, the thermoforming process is disabled. If the MMS criteria are met, tag 18a traverses a interrogator field 82 and tag 18a writes and locks final data into non-volatile tag 18a memory before pallet 4 exits the field to enter the supply chain. Other tags 18b, 18c, 18d and 18e do not interface with interrogator fields 72 and 82.

Figure 10:
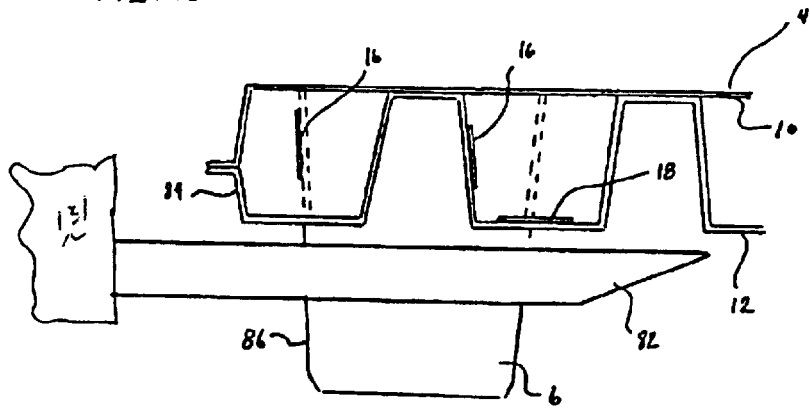
FIGS. 10–12 are cross sectional views showing various radio frequency device locations within the present invention pallet.
Figure 11:
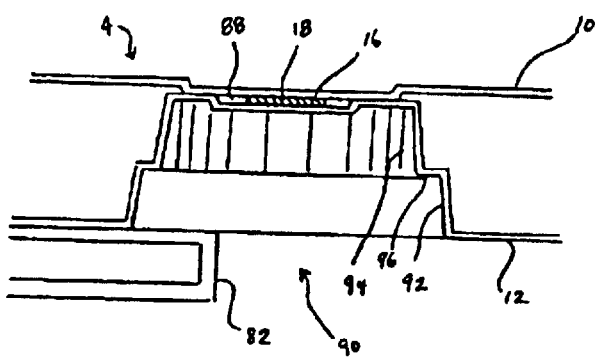

Referring now to FIG. 10, pallet 4 is adapted to enhance the ability of devices 16 to survive long term pallet handling wear and tear. In particular, tines 82 of a fork lift vehicle 131 are used to move pallets 4 throughout the distribution network. When tines 82 are introduced between pallet legs 6 in order to support the weight of pallet 4 for transportation, several potentially damaging events may occur. For example, tines 82 may impact side-walls 84 of pallet 4 or legs 6. Therefore, when systems (new and pre-existing) criteria necessitates a relatively close read range, and it is desirable to position the devices 16 in the area of side wall 84 or outside feet 86, it would be advantageous to affix devices 16, such as tags 18, on lower sheet of plastic 12 away from potential areas of tine 82 impacts. Devices 16 can also be advantageously positioned on sheet 10 as may be preferred in the embodiment used, with several acceptable locations being shown. As tines 82 are introduced through pallet 4, abrasion and shear may also occur along the path traveled by tines 82. Accordingly, locations containing devices 16 may be reinforced to absorb and protect a device chamber 88 within which the devices 16 reside. This is illustrated in FIG. 11. A variety of potential chamber designs are possible in both twin and triple sheet constructions. In twin sheet constructions, the preferred methodology is to encapsulate each device 16 between two sheets of plastic 10 and 12 in an arrangement that provides compressive, flexural, shear and anti-abrasion strength in a zone 90 contiguous to chamber 88. A vertical side wall 92 of sheet 12 circumventing chamber 88 may incorporate vertical details 94 and/or horizontal details 96 improving the strengthening criteria. Chamber 88 is further strengthened by top sheet 10 being locally recessed or lowered, in side-to-side elevation, so as to position the chamber away from the load bearing surface of pallet 4 and in particular the edges of packaging and objects supported thereon.

Figure 12:
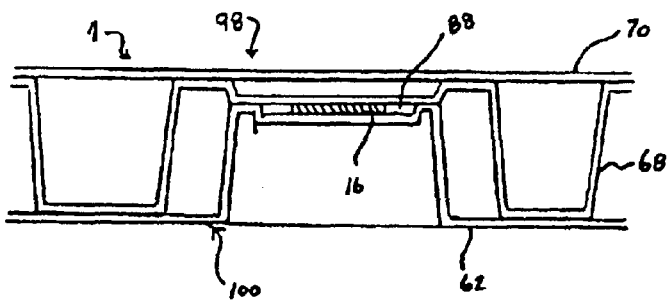

In triple sheet constructions, other pallet strengthening techniques can be used to increase the survivability of devices 16 within chamber 88. Sheets 62, 68 and 70 are formed to substantially position chamber 88 between a top load-bearing surface 98 and a bottom tine contacting surface 100 of pallet 4 so that devices 16 are isolated from damaging events within the core of the pallet 4. This arrangement is illustrated in FIG. 12.

Figure 13:
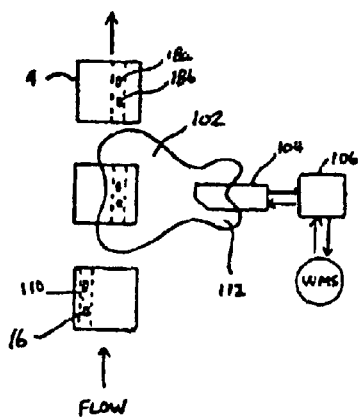
FIG. 13 is a diagrammatic view showing the interaction between an interrogator and the radio frequency device employed with the present invention pallet.

As understood in reference to FIG. 13, devices 16, and in particular tag 18b, are transported through a zone 102 proximate to an interrogator 104. Interrogator 104 interfaces with a LAN PC 106 networked to a Warehouse Management System (hereinafter "WMS"). This creates an implementation criteria that is reliable and secure for data retrieval and storage occurring while pallet 4 transits zone 102. When the read/write distance capability of interrogator 104 is limited and necessitates a predetermined orientation of pallet 4, some inconvenience may occur because pallet 4 will have to be rotated 180°. As this is impractical within a smooth flowing WMS, two means of intervention may be taken to prevent this undesired handling. A first means is to apply a color-coded polymeric strip 110 upon plastic sheet 70 (see FIGS. 9 and 12) at the time of extrusion which corresponds to the location of devices 16. In this manner, the pallet may be oriented by visual design for expediency. This will be discussed in further detail hereinafter.

Figure 14:
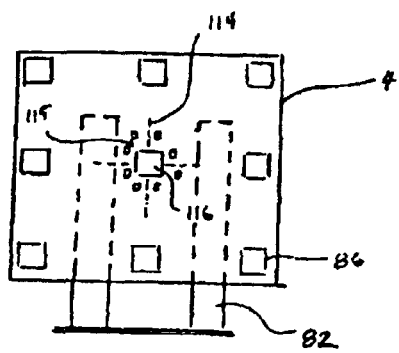
FIG. 14 is a top elevational view showing an exemplary radio frequency device orientation employed with the present invention pallet.

System interference may also occur if nearby devices 16 travels outside interrogation zone 102 but through the interrogator's signal pattern 112. Similarly, as pallet 4 is traveling through the WMS, device 16 may excite other interrogators coming within reader range. These occurrences may lead to unreliable data. In order to minimize these and other potential problems, it is preferred to encapsulate devices 16 along a center axis 114 of pallet 4. This is shown in FIG. 14. Axis 114 may progress from either the long or short side of the 48 inch by 40 inch pallet 4. Devices 16 are positioned along axis 114 which resides in a zone 115 contiguous to a center leg 116 of pallet 4. In this manner, tag 18 can be interrogated from either the right or left hand side of pallet 4.

Figure 15:
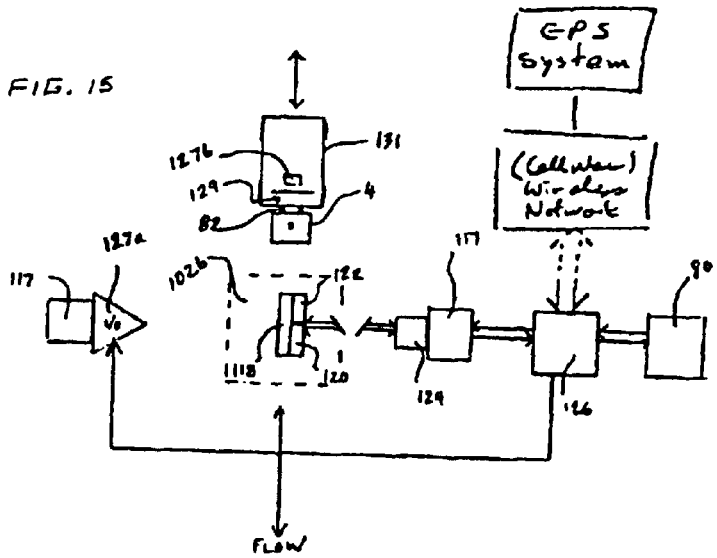
FIG. 15 is a diagrammatic view showing the interaction between the interrogator and radio frequency device employed with the present invention pallet.

Referring to FIG. 15, where a RFID system is being employed within a new setting, it is advantageous to position elements of a fixed field interrogator, such as a transit portal 117, upon, below or well above the ground along the path transited by pallet 4. Accordingly, an over or an under bearing RF link is provided when pallet 4 travels through an interrogator field 102b. This arrangement also ensures that spaced apart metal tines 82 do not deflect interrogator signals, thus causing unreliable reads. In the preferred embodiment, elements of the interrogator that are positioned for an over or under bearing read pattern include an interrogator antenna assembly 118 and transmitter and receiver modules 120 and 122, respectively, and an interrogator data processing and control module 124, which is proximate a LAN PC 126. With this arrangement, improved read capability is integral to criteria for implementation reliability and security.

It may also be understood in connection with FIG. 15, that PC 126 may communicate with read result display(s) 127a positioned proximate interrogation zone 102b in a fixed location visible to the operator controlling the movement of the pallet, or wirelessly to a display 127b on a console 129 of a motorized pallet transporting vehicle 131. In this manner, the system is integrated to facilitate economical movement of pallets 4 through interrogation portal 117 and distribution network.

In the present invention, a pallet and corresponding load of tagged objects, or stack of pallets, are positioned within the interrogation zone by a manually operated motorized pallet transporting vehicle. The interrogation field detects the vehicle within the zone by a triggering device. The interrogator communicates with the tags in the zone, and upon completion of this task, communicates with a visual message delivery device that is operative to instruct the driver to exit the interrogation field or pass through the portal. An LED light or the equivalent can be positioned on the drive console of the vehicle to inform the driver to stop and proceed. A stop and go light arrangement can also be positioned within the field of view of the driver to achieve the desired communication. Alternately, the host computer receiving pallet information can interface with pallet transporting vehicle by displaying on a console where the pallet is to be stored within the warehouse.

Figure 16:
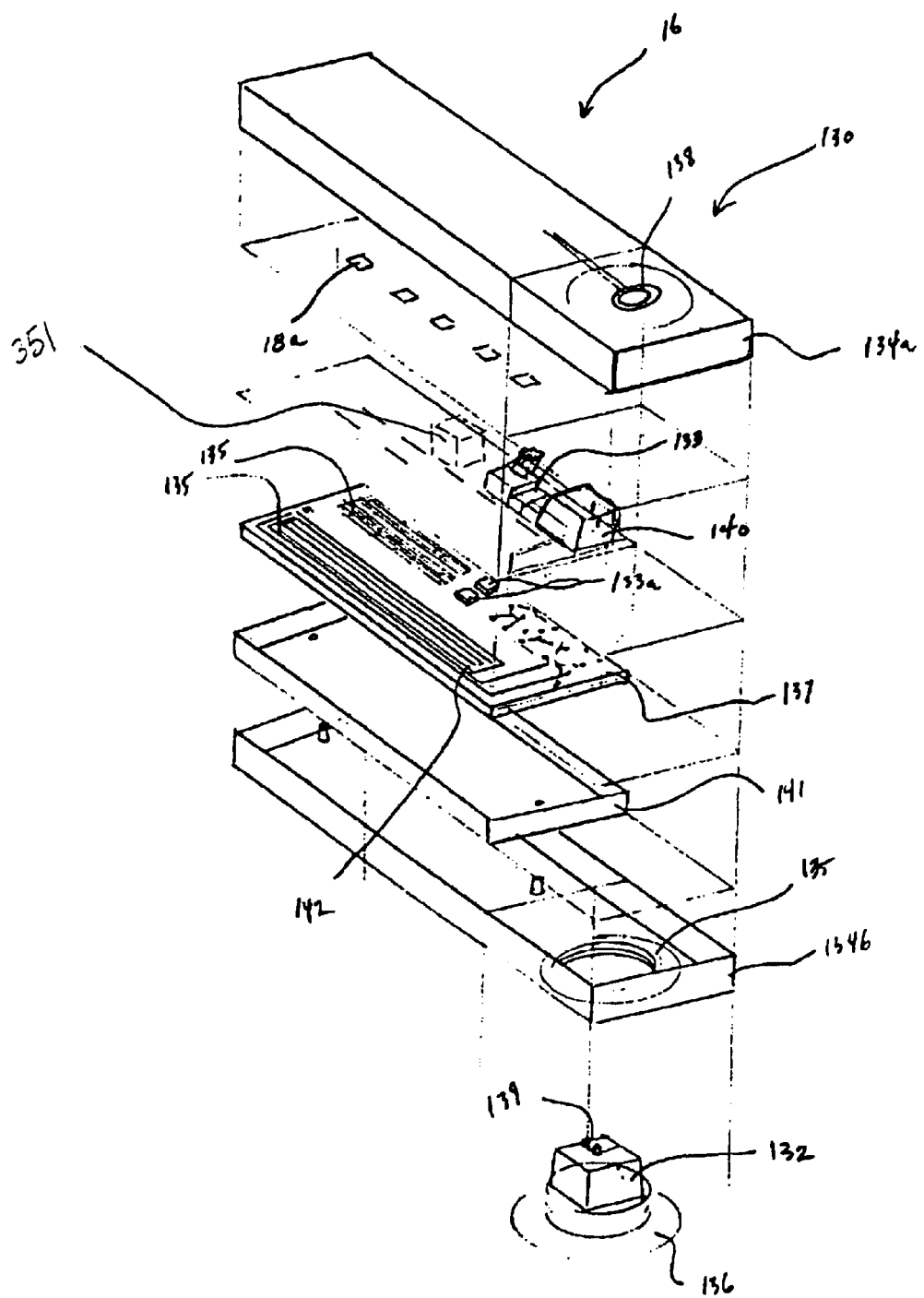
FIG. 16 is an exploded perspective view showing an interrogator incorporated into an alternate embodiment of the present invention pallet.

Reference should now be made to FIG. 16. Another feature of the present invention employs encapsulating an interrogator communications device 130 between the sheets forming pallet 4. Interrogator 130 could be adapted through system architecture to take an inventory of the tags 18 or sub-set of tags 18 residing upon pallet 4. It should be appreciated that interrogator 130 is a substantially larger device 16 than tag 18. It may therefore be impractical to encapsulate interrogator 130 within pallet 4 in the process manner outlined above. In order to insert interrogator 130 within pallet 4, the following methodologies would be preferred. In a twin sheet pallet construction, interrogator 130 is delivered to a selected location by means of a shuttle type delivery system that is adapted to move from a position outside the form station where apparatus loads an interrogator from a supply, to a position inside the form station, where the apparatus unloads the interrogator; it then shuttles back to load another interrogator, in between the time first sheet 10 is thermoformed and when it is sequentially fused to thermoformed second sheet 12. The shuttle type delivery system could also be adapted to located a plurality of devices 16, also including tags 18, between the time first sheet 10 is molded and second sheet 12 is fused to first sheet 10 in a twin sheet construction. A shuttle system of the type may alternately be substituted with a robotic arm.

It will also be appreciated that interrogator 130 will draw a considerable amount of power for operation. Interrogator 130 is therefore active, with power supplied from a battery 132. From time to time, interrogator battery 132 may be replaced according to a maintenance schedule contained in a data array of one of tags 18, preferably tag 18a. As was also the case with tags 18, interrogator 130 will fail if delicate instruments 133, memory and integrated circuit chips 133a, or circuitry 135 printed on a circuit board 137 are damaged during the high temperature and compression events of the thermoforming process. Intervention is thus required to insert battery-powered devices 16 between sheets of plastic.

Interrogator 130 is enclosed in a heat and compression resistant thermoplastic housing 134. A housing base 134b has a flange and threaded section 135. Threaded section 135 accepts a thermoplastic seal and threaded plate 136. Plate 136 is removable to replace or recharge battery 132. Tags 18 may also be embedded in pallet 4 inside housing 134. Alternately, tags 18 are manufactured or deposited upon circuit board 137 of interrogator 130. As shown, battery 132 may be mounted to plate 136 adapted to reconnect the battery as the plate is threaded to a closed position. Spring terminals 138, concentrically arranged about an axis corresponding to the rotational path of the terminals 139 on the affixed battery 132, are developed to ensure robust connection and enduring power supply. An EMI shield 141 is provided to prevent tag reading interference; otherwise multiple pallets with goods on each pallet stored on warehouse racking may demand the use of a directional antenna 142. Housing flange 135 is larger in diameter than a circuit board assembly. The circuit board assembly can be removed for maintenance, upgrading and recycling of pallet 4. It is preferred that housing 134 is recyclable with the pallet when emptied. Other arrangements enclosing the devices in protective housings to withstand the rigors of thermoforming are also practical.

In order for pallet interrogator 130 to communicate with a LAN PC, a Wireless Wide Area Communication System 140 is added. System 140 can be a cellular communicator inter-operating in an open standard environment. In the event FCC's E-911 mandate precludes utilizing cellular communications in this application (i.e. GPS), an alternative technology that can be used is wireless PC communications. The circuitry of a RF based interface PC card for a mobile PC device could be deposited upon circuit board 137. A local area Ethernet communicator interfaces the PC card circuitry with a LAN PC, and through the LAN PC by the Internet to host computer(s) 80. One or more circuit board antennas 142 may be slaves to several communications devices, as is battery 132.

In the triple sheet configuration of FIG. 17, housing 134 is contained in chamber 88 formed between plastic sheets 12 and 14. After first sheet 12 is thermoformed, a shuttle type delivery system is used to deliver housing 134 to chamber 88 such that flange 135 is selectively positioned upon first sheet 12. Concurrently, sheet 14 is thermoformed. The shuttle is extracted from the forming station, and interfacial fusion next occurs where sheets 12 and 14 are compressed together in the thermoforming operation. Housing 134 is enclosed between two sheets of plastic. Third sheet 10 is thermoformed over a third molding surface and subsequently brought into compressive contact with sheets 14 and 12. It is not necessary that sheet 10 fuse under compression with sheet 14 at the location of interrogator chamber 88. Before (die cut in mold) or after pallet 4 exits the thermoforming operation, an orifice on sheet 12, adjacent threaded section 135, is removed (by trimming) to later receive battery pack 132 affixed to plate 136. Alternately, it may be advantageous to place housing 134 into a chamber formed by sheets 14 and 10. It may also be advantageous to chill the plate so that when the plate expands thermally, it produces a more robust closure.

The wireless interrogator is instructed to identify a plurality or sub-set of the RFID tags associated with articles supported upon the pallet. Thus, a pallet would be able to perform, for example, its own inventory check by arrangement.

The present invention is further advantageous over conventional systems, such as that disclosed in U.S. Pat. No. 5,936,527, since inserting a wireless active interrogator in a plastic pallet of the present invention allows transportability and can be instructed to perform an operation anywhere or at any selected time within the wireless network. Examples of such a wireless network includes digital telephony, satellite communications, wireless Internet, microwave, cellular transmissions, and the like. Among other alternate embodiments of this aspect, is an optional renewable power supply device 351 (see FIG. 16) that rectifies voltage generated by the antenna coils into stored energy in a battery at the interrogator in the plastic pallet or container. This effects battery size, replacement schedules, and other problems associated with wireless active interrogators. This renewable device generates energy, which recharges the associated battery, spring or other power reservoir in response to external agitational movement of the pallet during transit. The internal mechanism for the renewable device can be made in accordance with U.S. Pat. No. 4,500,213 entitled "Ultra-Flat Self Winding Watch" which issued to Grimm on Feb. 19, 1985, and is incorporated by reference herein. The internal circuitry is shown in FIG. 24 wherein the capacitor act as the power storage reservoir. Renewable device 351 employs an oscillating weight 361, rotor 363, top generating coil block 365, circuit block 367 with an integrated circuit 370, bottom generating coil 369, capacitor/condenser 371 and battery/power source 373. Battery 373 is electrically connected to the communications device which includes an active tag 375, an interrogator 377 and a communicator 379.

Moreover, the wireless active interrogators could also be positioned within a molded structure forming part of the plastic pallet. A battery supply information field could be part of the manufacturing memory tag or third party pallet management memory array as preventative maintenance schedule field.

Yet another advantage of the aspect of encapsulating a plurality of RFID devices within the structure of a thermoformed pallet is that the same pallet can be tracked through different networks that interface according to differing substantially proprietary protocols. There are several popular data encoding methods, at least three data modulation standards and a handful of proprietary anticollision backscatter formats. It is unlikely that in the future, one device will be able to interface will all deployed systems because an open standard for interoperability has not overcome issues with respect to proprietary technologies. There is also a range of operating environments and computer operating system platforms to interface with. A combination of devices within one product that enables functionality at many locations with pre-existing system infrastructures will help propel the plastic pallet through the distribution system. Notwithstanding, one tag device with several proprietary circuits could be coupled with one or more memory chips, and one antenna coil.

According to yet another aspect of the invention, one or a plurality of RFID devices are provided within a single plastic pallet. For example, one such tag may be dedicated to manufacturing, material and recycle information storage. One tag may be specifically adapted for pallet tracking within the distribution system. The pallet may also host a third RFID device specified by third parties for specialized inventory tracking activities within closed-loop or associated distribution networks. A fourth tag may be developed to consolidate the data arrays of several tags transported upon the pallet for more efficient data compression and transfer. A fifth tag may be adapted for interfacing with the RFID systems deployed by the trucking industry. Accordingly, one or more RFID devices may be embedded within one pallet to facilitate one or more operations according to different implementation objectives that ultimately increase the efficiency of plastic pallets.

According to this additional preferred aspect of the present invention, one RFID device is used during the pallet manufacturing process. A relatively simple, programmable passive RFID device that provides a bi-directional interface for one-time programming and multiple readings of the memory is used. The tag on the plastic sheet is interrogated to instruct the PLC of the thermoforming machine how the sheet is to be processed. In one such example, even though the standard 48 inch by 40 inch wooden pallet is designed to carry 2,800 pounds, the GMA claims approximately 30% of the unit loads weigh less than 1,000 pounds, and 66% of unit loads weight under 2,000 pounds. Accordingly, the preferred thermoforming method may be used to produce a select range of standard plastic pallets, that are produced using different plastic formulations and processing guidelines, to meet different distribution system needs. The machine PLC may then be instructed to communicate to the tooling to instruct the tooling how to process the successive sheets. The thermoforming machine, production tooling and sheet materials thus interface with each other to recognize, synchronize, authenticate, implement and record manufacturing results to a manufacturing biased host computer. The memory array of the proposed device is limited to read-only data transmission and is disabled from accepting further programming or erasing instructions once the pallet is made but before the tagged pallet enters the pallet supply stream. The memory array of the manufacturing related RFID device will contain information pertaining to manufacture date, serial number, load bearing capabilities, operating temperatures, material composition, repair instructions, expiration date, recycling requirements, ownership, ISO certificates and the like. The data contained in the array could be tailored toward the needs of a third party pallet rental/leasing company, which can schedule and perform RFID and pallet maintenance.

This embodiment is explained in more detail as follows, with reference to FIG. 18. An end use customer requests a custom made final product by communicating his specifications manually to a sales office or through a remote electrical communications interface, such as the internet. The control system computer will use predetermined algorithms and look up tables to automatically determine the optimum manufacturing criteria for these customer specifications. The determined manufacturing criteria is subsequently communicated to the tag manufacturing plant's local host computer.

The tags are sequentially deposited upon a roll at which point the tags receive selective data information which is pre-programmed or stored in the memory of each tag. The pre-formed sheets, containing the RFID tag, are subsequently conveyed to the thermoforming plant or machinery for processing into end products, shown in the figure as product A and product B.

The RFID tag on the sheet traverse and travel through the interrogation field prior to entry of the sheet into the thermoforming machine. Data previously stored and programmed into the RFID tag memory is thereby communicated to the thermoforming machine PLC attached to the interrogator. The PLC thereby analyzes the received data and adjusts the manufacturing operation and machinery as predetermined for the specific data criteria analyzed.

For example, fire retardant fillers in the plastic sheet require a longer period of time for heating in the ovens. Thus, data regarding the presence of fire retardant materials, which has been previously programmed or stored in the RFID tag memory, instructs the PLC of its presence and the PLC then controls the machinery to provide increased heat in the ovens for the specific sheet about to enter the ovens. The next sheet to be processed may not have a fire retardant filler and thus the PLC will accordingly vary the machinery and processing operation to reduce the oven heat applied to that subsequent sheet to be processed. In another example, an end product may be desired to have a metal inserted frame for increased load bearing strength. When the interrogator receives this information from the RFID tag attached to a sheet to be processed, the PLC operating the processing machinery will then instruct an auxiliary input A machine to insert a metal frame between a pair of the sheets being processed. This can be done by a robotic arm or through other automation. The process is completed according to the preprogrammed manufacturing instructions in the machinery PLC, as altered or varied by data stored in the RFID tag for each sheet being processed. After completion, the PLC communicates the record of completion to a network computer for billing purposes and other statistical process control information.

Still according to another aspect of the present invention, one or more RFID devices are used to identify, locate and track a pallet within the distribution network throughout the pallet's life cycle. In the manner, computer based tools can be utilized to increase the velocity of the pallet through the system. In other words, the pallets are managed as an asset rather than an expense. The pallet is tracked using a more complex programmable RFID device that provides a variety of operating modes (single tag/multiple tag environments), including multiple write and read (EEPROM) capabilities. Tagged pallets traverse interrogation fields distributed throughout the distribution network to record the pallet's progress through the distribution system. The RFID devices include anticollision modulation options to resolve backscatter when multiple tags are in the same interrogation fields. Automatic pallet material handling equipment is upgraded to accommodate readers and communicators. Supply chain management and control of the movement of pallets through the distribution system are facilitated with real-time data input from the integrated RFID system. Host, interrogator and tag interface according to various implementation criteria, such as last scan time & date, movement order number field, "from" field, "to" field, shipper field, pallet rental release field, and pallet return instructions. RFID technology provides a two-way flow of information between the pallet and the system server to help propel the pallet through the distribution system. The RFID devise may also carry its own electronic manifest. A more efficient use of plastic pallets will reduce the total number of pallets required by the over all distribution system.

According to a further feature of the present invention, each RFID device that is contained in the pallet may be developed to operate on different radio frequencies (13.56 megahertz to 2.45 gigahertz) in order to optimize system performance and minimize the cost of interrogators and tags. Each device may use a different coding waveform algorithm to reduce data recovery errors, bandwidth problems, synchronization limitations and other system design and cost considerations. For example, the pallet manufacturer does not need interrogation systems interfacing with the tracking systems, and vice versa. Thus, a less elaborate and costly RFID system is needed by the thermoforming manufacturer to deploy RFID systems. Similar tag device transmissions may be echeloned according to prescribed system criteria or other pallet management tools or model algorithms.

As Faraday's law and Lenz's law are well known, it is also understood that the parallel orientation, and the distance between the reader and tag antenna coils in respect of each other are important for the successful operation of passive RFID devices in particular. Read range is lower in higher frequency passive RFID devices. Furthermore, it is understood that induction is maximized when the antenna coils are perpendicular to the direction of the radio frequency signal. Therefore, another feature of the present invention provides for encapsulation of RFID devices within the structure of the plastic pallet. In one embodiment, an interrogator is contained in a vertical freestanding structure off to the side of the path traveled by the RFID device. Accordingly, the antenna coils located in the interrogator and pallet are vertically oriented in approximate parallel condition to facilitate a proper signal transmission. In another embodiment, an interrogator is placed upon or under ground along the path traveled by the pallet, or alternatively suspended from above. In such an arrangement, it is advantageous to orient the respective antenna coils substantially horizontal in an approximate parallel condition to facilitate induction. These later arrangements would be difficult to duplicate and implement with wooden pallets because water absorbed by the wood would impede or reflect the RF signal away from the tag antenna.

Figure 19:
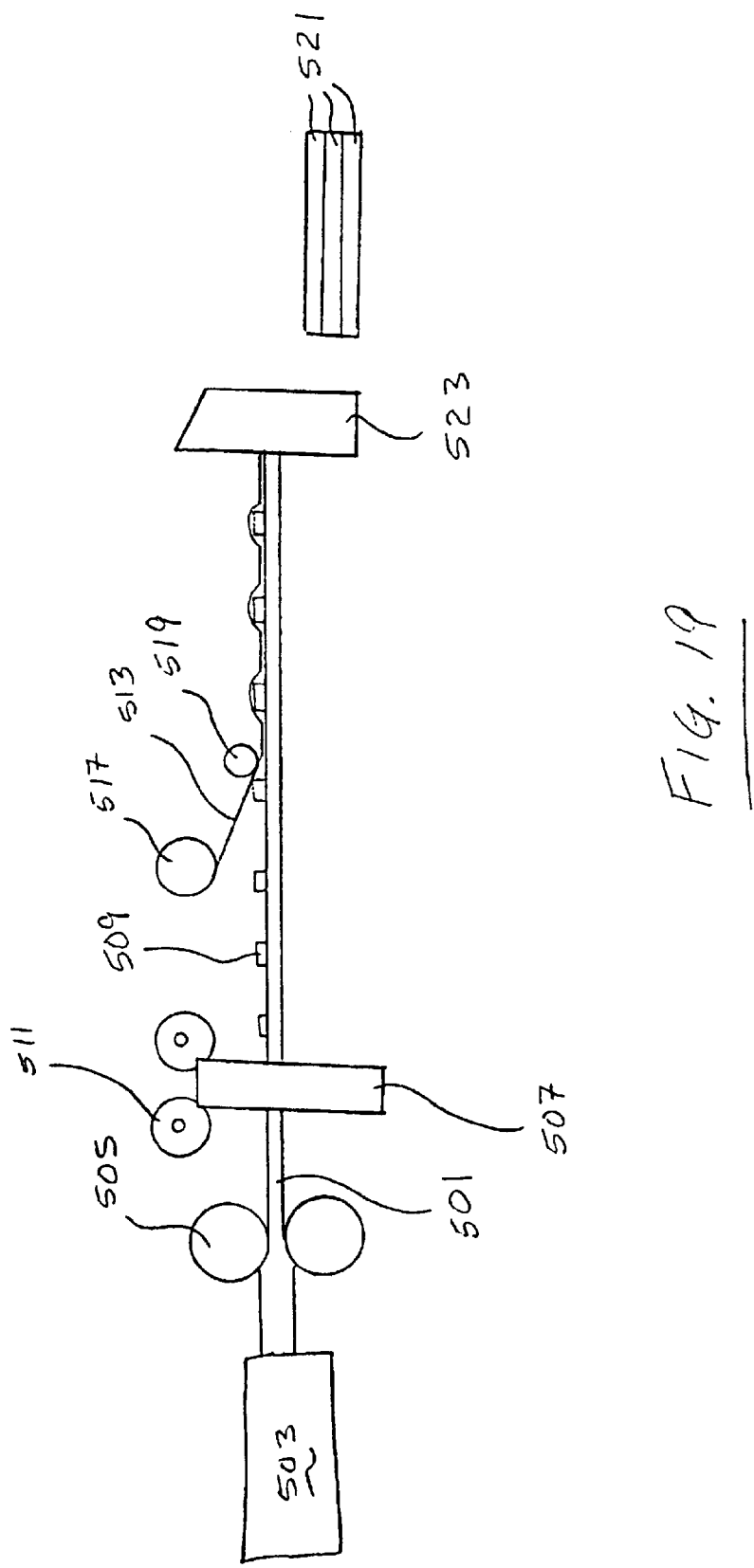
FIG. 19 is a diagrammatic view showing another preferred embodiment manufacturing process employed with the present invention pallet.

A further preferred method of attaching RFID tags to polymeric sheets is as follows, with reference to FIG. 19. A polyethylene or polypropylene sheet 501 is created by an extruder 503 and a pair of opposed rolls 505. The continuously created sheet is then fed through an indexer 507 at which point RFID tags 509 are fed from tag rolls 511 which are deposited in a spaced fashion upon an upper surface of sheet 501. A narrow roll of polyethylene or polypropylene film 513 is simultaneously unwound from a film roll 517 and then compressed by a spring biased application roller 519 upon sheet 501 and covering each tag 509. The film is thermally bonded to sheet 501 by compression of heated spring biased application roller 519. The continuous sheet 501 is subsequently sheared or cut into separate preformed sheets 521 by a shearing machine 523.

Figure 20:
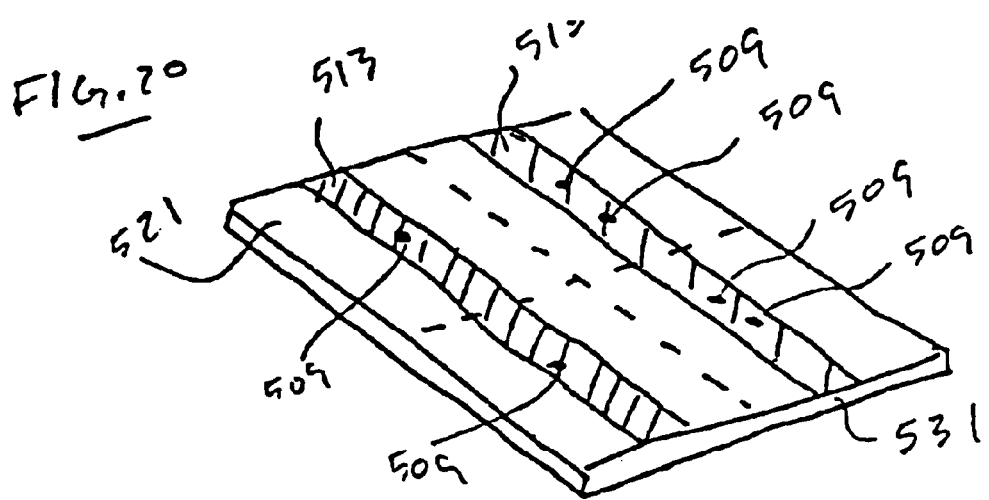
FIG. 20 is a perspective view showing the present invention pallet of FIG. 19.
Figure 21:
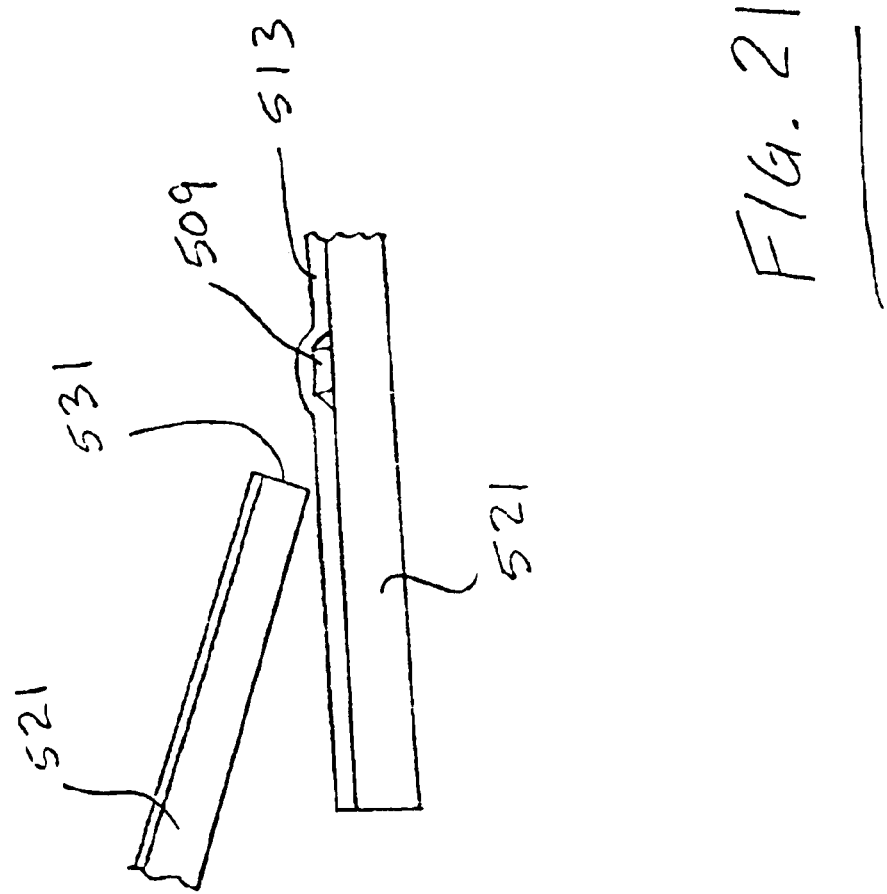
FIG. 21 is a fragmentary side elevational view showing the present invention pallet of FIG. 20.

It is alternately envisioned that the film is colored so that it can be used to indicate tag location inside of a pallet for correct orientation to provide accurate readings as previously disclosed. For example, a plurality of colored films may be applied to denote RFID tag implementation criteria. For example, FIGS. 20 and 21 show a four-up sheet wherein one operation yields four formed parts; in other words, four pre-formed sheets, with their respective RFID tags, are not severed until after thermoforming. Film 513 is shown in two distinct and parallel, elongated locations covering RFID tags 509 upon the four-up sheet 521. Film 513 further protects the underlying tags 509 as a leading edge 531 of a subsequently severed sheet is angularly moved along a lower sheet 521 during stacking.

Figure 22:
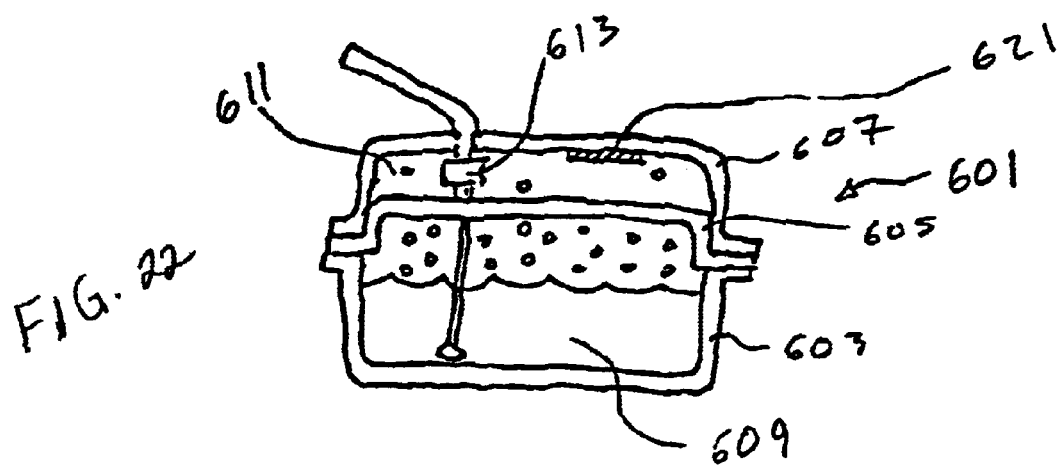
FIG. 22 is a cross-sectional view of a preferred embodiment tank container of the present invention.

Another preferred embodiment application of the thermoforming and communications device technology is shown in FIG. 22. In this embodiment, a gasoline fuel tank 601, such as those used with an automotive, motorcycle, all-terrain vehicle, airplane, boat or other motorized vehicle, is made using twin or triple sheet thermoforming. Tank 601 is made of three, three-dimensionally formed sheets of plastic, 603, 605 and 607, respectively, which are all joined together during processing. A bottom hollow section 609 operably contains a liquid, such as gasoline fuel. A top hollow section 611 contains a fuel filler, filter, and other standard devices 613 necessary for the operation of tank 601.

A communications device 621 is attached to an inside surface of sheet 607 within top hollow section 611 prior to thermoforming, as was previously disclosed herein with the pallet manufacturing. As the fuel is removed for engine combustion, environmentally hazardous gases are left to fill the space unoccupied by the fuel. Top hollow section 611 acts as a reservoir that contains the harmful gases that would otherwise escape through the devices 613 into the environment. The devices 613 can also recirculate the gas back into lower hollow sections 609, in a conventional manner. An instrument section of communications device 621 is operable to inspect and monitor the barrier performance of top hollow section 611 to ensure compliance with governmental regulations. When the vehicle is inspected, the data generated and stored by the instrument of device 621 is then conveyed through radio frequency communications to an external monitoring device operated by the governmental regulating authority for inspection purposes. The instrument section of device 621 can be battery activated in an active manner to provide regular intervals of inspection, can be passive to receive power when externally interrogated, or can be triggered one time when a predetermined threshold is met.

Figure 23:
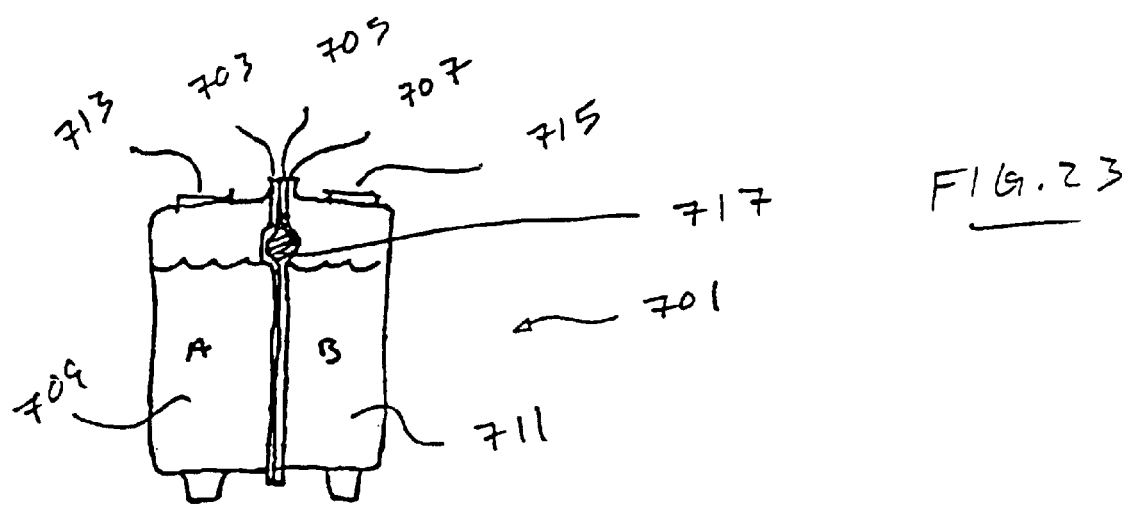
FIG. 23 is a diagrammatic view showing another preferred embodiment tank container of the present invention.

A further preferred application of the present invention is shown in FIG. 23. A bulk container 701 operably carries a hazardous material therein. For example, a two-part polyurethane container system is made from three sheets 703, 705 and 707 which are thermoformed and joined as previously disclosed herein to provide container 701 with two reservoirs 709 and 711. Flange plates 713 and 715, having threads, are formed onto container 701 to receive metering pump elements (not shown). These flange plates are made in accordance with those disclosed for battery replacement in the pallets. Pockets or receptacles 717 are created between adjacent internal sheets 703 and 705 at an overlapping margin to receive RFID tag devices. The RFID tags perform a range of functions which include recording of chemical formulas of materials contained within reservoirs 709 and 711, storage of safety data for storing, clean up information, worker injury information (such as that traditionally contained on a material safety data sheet), temperatures, thermal shock, and for disposal instructions. This data can later be interrogated by an external interrogator or the like.

While the preferred embodiment of a thermoformed pallet having a radio frequency device has been disclosed, it should be appreciated that other variations may be employed. For example, with a shuttle type delivery system and methodology, the gantry and laminator apparatus are not required. There are several other methodologies that may be used to practice the useful purposes of embedding sophisticated communications and other technological devices within the structure of plastic pallet 2. Furthermore, analog or solid state circuitry can be employed instead of the microprocessors, integrated circuits and computers disclosed. There are a number of different reinforcing structures that can be molded into two or more sheets of plastic to reinforce the area around devices 16. It is not necessary to form a complete chamber in plastic, so long as device 16 remains in the areas developed to protect the device from thermoforming shock, and operating wear and tear. It is also understood that access to the devices may be from the top or bottom in the wide variety of pallets contemplated in the present methodology. Furthermore, the RFID tags can also be attached to other heat and pressure formable sheets, such as cardboard, fiberglass, or the like, prior to three dimensional forming of the sheets. Additionally, the RFID tags and other electrical communications devices can be employed to monitor food conditions within a food container. While various materials have been disclosed, it should be appreciated that other materials can be employed. It is intended by the following claims to cover these and any other departures from the disclosed embodiments which fall within the true spirit of this invention.

The invention claimed is:

1. A system comprising:
   a manufacturing machine;
   a receiver;
   an electrical control system connected to the receiver and the machine;
   a product having multiple sheets and a data storage device located between the sheets, the product being manufactured by the machine;
   the receiver operably interfacing with the data storage device to ascertain data previously stored on the device, the control system changing manufacturing characteristics of the machine based on a data received from the device.

2. The system of claim 1 wherein the data is ascertained by the receiver from the device prior to manufacturing of the product containing the device by the machine.

3. The system of claim 1 wherein the machine includes a mold operable to three-dimensionally shape the product.

4. The system of claim 1 wherein the machine includes a heater operable to heat the product to ease in forming.

5. The system of claim 1 wherein the machine includes a sheet extruder for making the product prior to attachment of the data storage device.

6. The system of claim 1 wherein the data storage device is a radio frequency identification tag.

7. The system of claim 6 wherein the receiver is an interrogator operable communicating with the radio frequency identification tag.

8. The system of claim 1 wherein the machine three-dimensionally shapes the product which subsequently becomes a pallet.

9. The system of claim 1 wherein the data storage device includes an antenna located entirely inside of the product when in its final manufactured condition.

10. A method of manufacturing a product with machinery, and method comprising:
    (a) electrically communicating between the product and the machinery in a wireless manner;
    (b) changing an operational characteristic of the machinery prior to processing the product in the machinery, based on the communication of step (a); and
    (c) shaping the product with the machinery after step (b).

11. The method of claim 10 wherein the product is a multiple sheet pallet, wherein the sheets are made of a polymeric material.

12. The method of claim 10 further comprising communicating between the product and the machinery by transmitting radio frequencies to identify preprogrammed characteristics of the desired end product to be manufactured.

13. An apparatus comprising:
    a pallet having a first RFID tag and a second RFID tag,
    said first RFID tag including externally readable data indicative of a first characteristic, and
    said second RFID tag including externally readable data indicative of a second characteristic.

14. An apparatus as set forth in claim 13 in which:
    said first RFID tag externally readable data includes non-erasable data.

15. An apparatus as set forth in claim 14 in which:
    said non-erasable data is indicative of a characteristic that is selected from the group consisting of manufacture date, serial number, load bearing strength specification, operating temperature, material composition, repair instruction, expiration date, recycling instructions, pallet ownership, and ISO certificate.

16. An apparatus as set forth in claim 13 in which:
    said first RFID tag externally readable data is permanently stored in non-volatile tag memory.

17. An apparatus as set forth in claim 13 which:
    said first RFID tag includes a passive tag.

18. An apparatus as set forth in claim 13 in which:
    said second RFID tag externally readable data includes data indicative of the location of the pallet.

19. An apparatus as set forth in claim 18 which:
    said data indicative of the location of the pallet includes data that is selected from the group consisting of an electronic manifest, a time record, a shipping address, and a bill accounting for the use of said pallet.

20. An apparatus as set forth in claim 13 in which:
    said second RFID tag externally readable data includes data indicative of the external environment of the pallet.

21. An apparatus as set forth in claim 13 in which:
    said second RFID tag externally readable data includes data indicative of a characteristic of a part transported by the pallet.

22. An apparatus as set forth in claim 13 in which:
    said second RFID tag includes a passive tag.

23. An apparatus as set forth in claim 13 in which:
    said second RFID tag includes an active tag.

24. An apparatus as set forth in claim 13 in which:
    said pallet includes a third RFID tag including externally readable data indicative of a third characteristic.

25. An apparatus as set forth in claim 24 in which:
    said pallet includes a fourth RFID tag including externally readable data indicative of a fourth characteristic.

26. An apparatus as set forth in claim 13 which includes:
    said first RFID tag being operable in a first RF environment,
    said second RFID tag being operable in a second RF environment, and
    wherein said first RF environment is incompatible with said second RF environment so that said pallet is interoperable between two incompatible RF environments.

27. An apparatus as set forth in claim 13 which includes:
    said first RFID tag operates on a first RF frequency,
    said second RFID tag operates on a second RF frequency, and
    wherein said pallet is interoperable between two RF frequencies.

28. An apparatus as set forth in claim 13 which includes:
said first RFID tag operating in a first proprietary operating environment,
said second RFID tag operating in a second proprietary operating environment, and
wherein said first proprietary operating environment is incompatible with said second proprietary operating environment so that said pallet is interoperable between two incompatible proprietary operating environments.

29. A material handling device comprising:
a first polymeric member,
a second polymeric member attached to said first polymeric member,
a first externally readable RFID tag positioned between said first member and said second member,
said first tag including information indicative of a first characteristic,
a second externally readable RFID tag positioned between said first member and said second member, and
said second tag including information indicative of a second characteristic.

30. A material handling device as set forth in claim 29 which includes:
said first RFID tag being operable in a first RF environment,
said second RFID tag being operable in a second RF environment,
said first RF environment being incompatible with said second RF environment,
said material handling device being interoperable between two incompatible RF environments.

31. A material handling device as set forth in claim 29 in which:
said first RFID tag operates at a first RF frequency, and
said second RFID tag operates at a second RF frequency.

32. A material handling device as set forth in claim 29 in which:
said first RFID tag operates in a first proprietary operating environment, and
aid second RFID tag operates in a second proprietary operating environment.

33. A material handling device as set forth in claim 32 which includes:
said first proprietary operating environment being incompatible with said second proprietary operating environment so that the material handling device is interoperable between two operating environments.

34. A material handling device as set forth in claim 29 in which:
said first RFID tag information includes non-erasable information indicative of the material handling device.

35. A material handling device as set forth in claim 34 in which:
said first RFID tag information includes information that is selected from the group consisting of manufacturing date, serial number, part number, material handling device specifications, material handling device material composition, ownership records, and ISO certificates.

36. A material handling device as set froth in claim 29 in which:
said first RFID tag includes a passive tag.

37. A material handling device as set forth in claim 29 in which:
said second RFID tag information includes information indicative of the location of the material handling device.

38. A material handling device as set forth in claim 37 in which:
said second RFID tag information includes information that is selected from the group consisting of an electronic manifest, a time record, a shipping address, and a bill for accounting for the use of the material handling device.

39. A material handling device as set forth in claim 29 in which:
said second RFID tag includes information indicative of the external environment of the material handling device.

40. A material handling device as set forth in claim 29 which includes:
a third externally readable RFID tag positioned between said first member and said second member, and
said third tag including information indicative of a third characteristic.

41. A material handling device as set forth in claim 40 which includes:
a fourth externally readable RFID tag positioned between said first member and said second member, and
said fourth tag including information indicative of a fourth characteristic.

42. A material handling apparatus comprising:
a first externally readable RFID tag,
a second externally readable RFID tag,
said first RFID tag includes non-erasable information pertaining to the material handling apparatus, and
said second RFID tag includes rewritable information pertaining to events associated with the use of the apparatus.

43. A material handling apparatus as set forth in claim 42 in which:
said first RFID tag information includes information intended for use by a material handling apparatus manufacturer, and
said second RFID tag information includes information intended for use by a material handling apparatus user.

44. A material handling apparatus as set forth in claim 43 which includes:
said first RFID tag information being information that is permanently stored in memory before the apparatus enters a material handling workplace.

45. A material handling apparatus as set forth in claim 42 which includes:
a third externally readable RFID tag including information,
a fourth externally readable RFID tag including information, and
said third RFID tag information and said fourth RFID tag information being indicative of characteristics useful to addition material handling apparatus users.

46. A material handling apparatus as set forth in claim 42 which includes:
said second RFID tag information being stored in volatile memory.

47. A method for using a material handling apparatus having an RFID tag comprising the steps of:
(a) moving the material handling apparatus into an interrogation field by means of a carrier,
(b) reading information stored in a memory component of the RFID tag after the moving step, and
(c) activating an indicator after the reading step to instruct an operator of the carrier to move the material handling apparatus out of the interrogation field.

48. A method as set forth in claim 47 which includes:
visually locating the indicator adjacent to the interrogation field, and
using visible light to activate the indicator.

49. A method as set forth in claim 48 which includes:
providing an indicator having a light that is visible to the carrier operator.

50. A method as set forth in claim 47 which includes:
providing an indicator that is located on the carrier.

51. A method as set forth in claim 50 which includes:
positioning the indicator on the carrier so that the indicator is visible to the operator of the carrier.

52. A method as set forth in claim 47 in which the RFID tag includes information which includes:
providing the RFID tag with information stored in a memory component and at least part of the information including instructions for the carrier operator where to position the material handling apparatus within a distribution network after exiting the interrogation field.

53. A method as set forth in claim 52 which includes:
positioning the indicator on the carrier so that the indicator provides the position within a warehouse to move the material handling apparatus.

54. A method for using a material handling apparatus comprising the steps of:
(a) affixing an RFID tag to the apparatus so that the RFID tag transmits information pertaining to the apparatus,
(b) providing a plurality of interrogators capable of receiving information from the RFID tag within a plurality of interrogation fields located within a distribution network,
(c) providing a plurality of local area computers so that each computer is located within an interrogation field and is connected to a host computer,
(d) providing a plurality of visual message delivery devices within the interrogation fields so that each visual message delivery device is connected to at least one of the local area computers and to the host computer,
(e) providing a carrier to move the apparatus within the distribution network,
(f) providing an operator to maneuver the carrier within the distribution network and to observe the devices,
(g) using the carrier to move the apparatus into one off the interrogation fields to allow one of the interrogators to convey the information pertaining to the apparatus contained on the RFID tag to at least one of the local area computers and the host computer, and
(h) therafter one of the local area computers and the host computer activates the device in the interrogation field observed by the operator to instruct the operator to maneuver the carrier and the apparatus out of one of the interrogation fields.

55. A method as set forth in claim 54 which includes:
providing one of the visual message delivery devices with a light that is visible to the operator.

56. A method as set forth in claim 54 which includes:
positioning one of the devices within the interrogation field adjacent to at least one of the interrogators.

57. A method as set forth in claim 54 which includes:
providing one of the visual message delivery devices having the ability to instruct the operator to remain within the interrogation field allowing at least one of the interrogators to receive complete information pertaining to the apparatus.

58. A method as set forth in claim 54 which includes:
providing an interrogation field having a triggering device that senses the carrier,
activating a local area computer to activate the device to instruct the operator to stop the carrier within the interrogation field.

59. A method as set forth in claim 54 which includes:
providing an interrogation field having a triggering device that senses the carrier,
activating one of the local area computers and the host computer to activate the device to instruct the operator to stop the carrier within the interrogation field, and
activating one of the local area computers and the host computer to activate the device to instruct the operator to resume maneuvering the carrier through the interrogation field.

60. A method of using a material handling apparatus comprising:
(a) affixing an RFID tag upon the apparatus for transmitting information pertaining to the apparatus,
(b) providing a plurality of interrogators capable of receiving information from the RFID tag with each of the interrogators being located in one of a plurality of interrogation fields located within a distribution network,
(c) providing a local area computer connected to each one of the interrogators within each interrogation field with the local area computers being connected to a host computer,
(d) providing a carrier to move the apparatus within the distribution network with the carrier including a visual message delivery device being wirelessly connected to at least one of the local area computers and the host computer,
(e) providing an operator to maneuver the carrier within the distribution network to observe the device,
(f) using the carrier to move the apparatus into one of the interrogation fields thereby allowing one of the interrogators to convey the information pertaining to the apparatus contained on the RFID tag to at least one of the local area computers and the host computer, and
(g) thereafter at least one of the local area computers and the host computer activating the device on the carrier observed by the operator to instruct the operator to maneuver the carrier and the apparatus out of one of the interrogation fields.

61. A method as set forth in claim 60 which includes:
positioning an LED light on the console of the carrier so that the LED light is operable to instruct the operator to stop within and proceed through the interrogation field.

62. A method as set forth in claim 60 which includes:
displaying where the operator is to store the apparatus within a warehouse.

63. A method as set forth in claim 60 which includes:
providing the interrogation field with a triggering device that senses the carrier.

64. A method as set forth in claim 60 which includes:

providing the interrogation field having a triggering device that detects the carrier, and thereafter informing the local area computer that the triggering device detected the carrier.

65. A method as set forth in claim 64 which includes:

activating the device to instruct the operator to stop or proceed through the interrogation field after the local area computer is informed that the triggering device detected the carrier.

66. A method as set forth in claim 64 which includes:

activating the interrogator to receive information pertaining to the apparatus transmitted by the RFID tag after the local area computer is informed that the triggering device detected the carrier.

\* \* \* \* \*